US011945884B2

United States Patent
Tanaka et al.

(10) Patent No.: US 11,945,884 B2
(45) Date of Patent: *Apr. 2, 2024

(54) FIBROUS CELLULOSE, FIBROUS CELLULOSE DISPERSION, AND PRODUCTION METHOD FOR FIBROUS CELLULOSE

(71) Applicant: OJI HOLDINGS CORPORATION, Tokyo (JP)

(72) Inventors: Akihiro Tanaka, Tokyo (JP); Hayato Fushimi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 17/285,725

(22) PCT Filed: Oct. 16, 2019

(86) PCT No.: PCT/JP2019/040635
§ 371 (c)(1),
(2) Date: Apr. 15, 2021

(87) PCT Pub. No.: WO2020/080393
PCT Pub. Date: Apr. 23, 2020

(65) Prior Publication Data
US 2022/0002442 A1 Jan. 6, 2022

(30) Foreign Application Priority Data
Oct. 16, 2018 (JP) .............................. 2018-195311
Mar. 27, 2019 (JP) .............................. 2019-061191

(51) Int. Cl.
C08B 5/00 (2006.01)
C08L 1/16 (2006.01)
C09D 101/16 (2006.01)

(52) U.S. Cl.
CPC ................. C08B 5/00 (2013.01); C08L 1/16 (2013.01); C09D 101/16 (2013.01)

(58) Field of Classification Search
CPC ............ C08L 1/16; C08B 5/00; C09D 101/16
See application file for complete search history.

(56) References Cited

U.S. PATENT DOCUMENTS

| 2018/0265597 | A1 | 9/2018 | Homma et al. | |
| 2020/0220210 | A1* | 7/2020 | Makino | H01M 10/058 |
| 2021/0156090 | A1* | 5/2021 | Matsusue | D21H 11/18 |
| 2021/0214571 | A1* | 7/2021 | Hasegawa | C09D 7/65 |
| 2021/0395494 | A1* | 12/2021 | Mizukami | C12P 19/14 |
| 2022/0098798 | A1* | 3/2022 | Watanabe | D21H 11/20 |

FOREIGN PATENT DOCUMENTS

| JP | 46-10551 | B1 | 3/1971 | |
| JP | 2017-208231 | A | 11/2017 | |
| JP | 2019-38979 | A | 3/2019 | |
| JP | 6540925 | B1 | 7/2019 | |
| WO | 2010/116826 | A1 | 10/2010 | |
| WO | WO-2011118746 | A1 * | 9/2011 | ............ C08B 15/02 |
| WO | 2012/043103 | A1 | 4/2012 | |
| WO | 2017/047768 | A1 | 3/2017 | |
| WO | 2017/141800 | A1 | 8/2017 | |
| WO | 2017/175468 | A1 | 10/2017 | |
| WO | 2018/012014 | A1 | 1/2018 | |
| WO | 2018/159473 | A1 | 9/2018 | |
| WO | 2018/216474 | A1 | 11/2018 | |
| WO | 2019/021619 | A1 | 1/2019 | |
| WO | 2019/043782 | A1 | 3/2019 | |

OTHER PUBLICATIONS

U.S. Appl. No. 17/919,921, filed Oct. 2022, Yamanaka, Mio.*
Shinoda et al., "Relationship between Length and Degree of Polymerization of TEMPO-Oxidized Cellulose Nanofibrils" Biomacromolecules vol. 13 pp. 842-849 DOI:10.1021/bm2017542 (Year: 2012).*
English machine translation of WO2018/216474, downloaded from worldwide.espacenet.com (Year: 2018).*
Gruneberger et al., "Rheology of nanofibrillated cellulose/acrylate systems for coating applications" Cellulose vol. 21 pp. 1313-1326 DOI 10.1007/s10570-014-0248-9 (Year: 2014).*
Naderi et al., "A comparative study of the rheological properties of three different nanofibrillated cellulose systems" Biorefinery Nordic Pulp & Paper Research Journal vol. 31 No. 3 pp. 354-363 (Year: 2016).*
English machine translation of WO2011/118746, downloaded form worldwide.espacenet.org (Year: 2011).*
International Search Report for PCT/JP2019/040635 dated, Dec. 24, 2019 (PCT/ISA/210).
Extended European Search Report dated Jun. 17, 2022 in European Application No. 19872831.3.
Vincenzo Calabrese et al., "Understanding heat driven gelation of anionic cellulose nanofibrils: Combining saturation transfer difference (STD) NMR, small angle X-ray scattering (SAXS) and rheology", Journal of Colloid and Interface Science, 2019, vol. 535, pp. 205-213 (10 pages total).
Communication dated Jun. 13, 2022 from the Chinese Patent Office in Chinese Application No. 201980068225.1.
Jianmao Tang, "Green Composite Materials", 2016 (2 pages total).

* cited by examiner

*Primary Examiner* — Eric Olson
(74) *Attorney, Agent, or Firm* — Sughrue Mion, PLLC

(57) ABSTRACT

An object of the present invention is to provide ultrafine fibrous cellulose capable of exhibiting excellent coating suitability when added to paint. The present invention relates to fibrous cellulose having a fiber width of 1,000 nm or less, in which, when the fibrous cellulose is dispersed in water to form a dispersion liquid having a viscosity of 2,500 mPa·s at 23° C., and the dispersion liquid is stirred under predetermined stirring conditions, a viscosity change rate falls within ±50%, calculated by the following formula: viscosity change rate (%)=(viscosity after stirring−viscosity before stirring)/viscosity before stirring×100.

3 Claims, 2 Drawing Sheets

[Fig. 1]
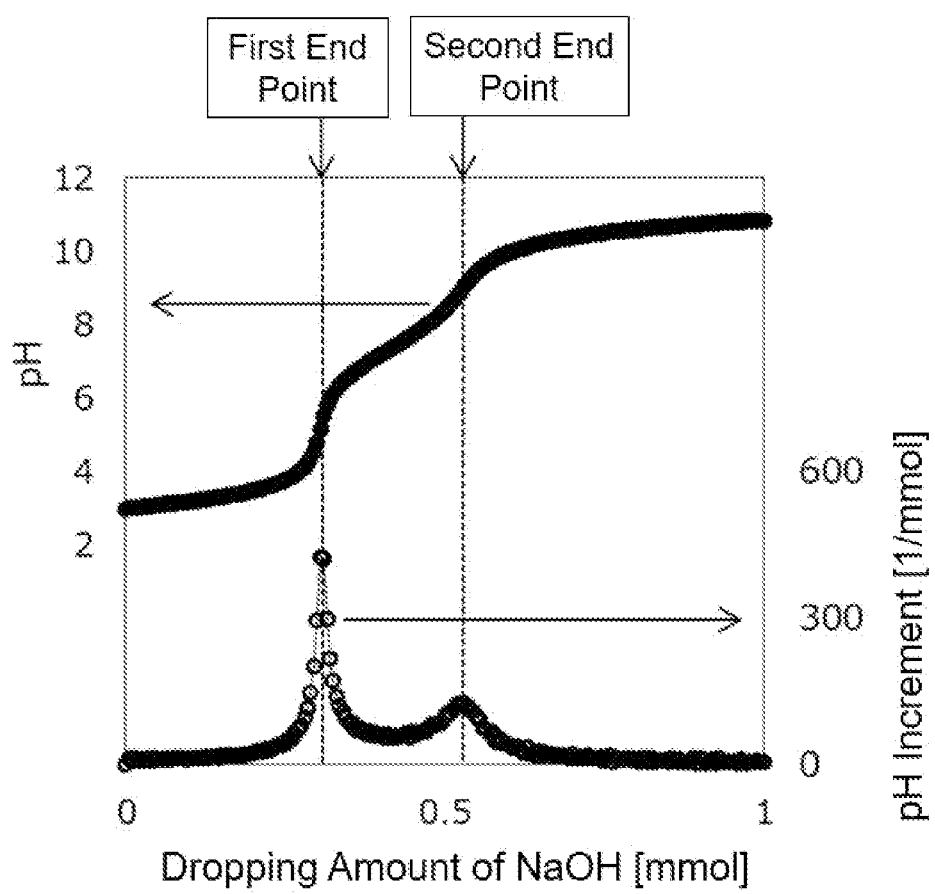

[Fig. 2]
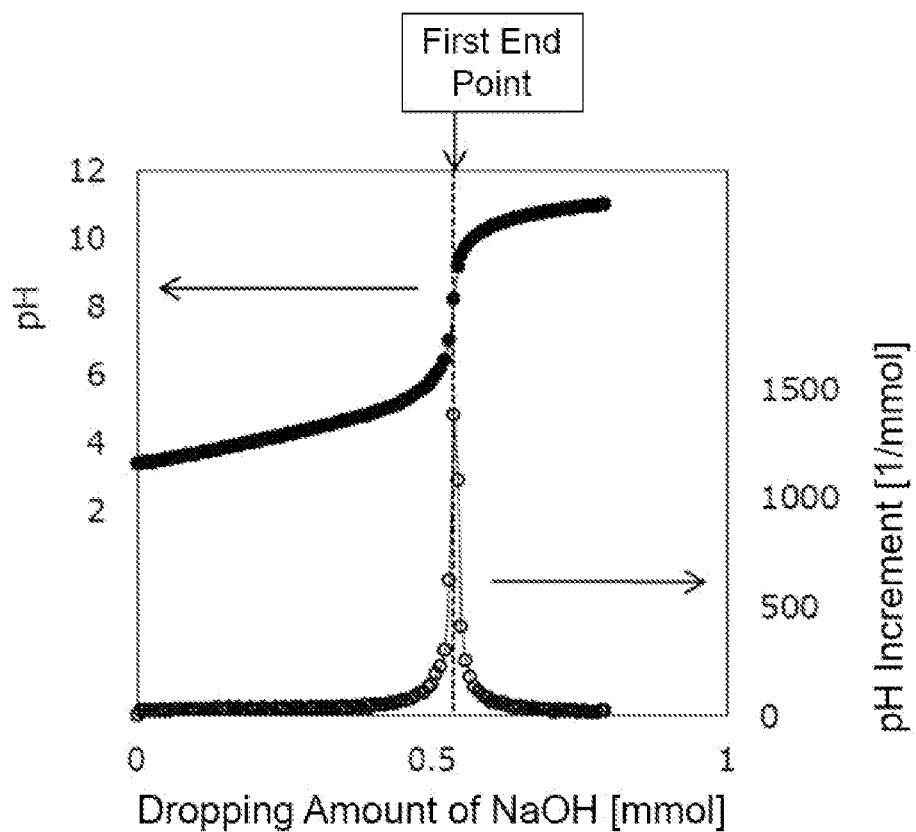

FIBROUS CELLULOSE, FIBROUS CELLULOSE DISPERSION, AND PRODUCTION METHOD FOR FIBROUS CELLULOSE

CROSS REFERENCE TO RELATED APPLICATIONS

This application is a National Stage of International Application No. PCT/JP2019/040635 filed Oct. 16, 2019, claiming priority based on Japanese Patent Application No. 2018-195311 filed Oct. 16, 2018 and Japanese Patent Application No. 2019-061191 filed Mar. 27, 2019.

TECHNICAL FIELD

The present invention relates to fibrous cellulose, a fibrous cellulose dispersion, and a production method for fibrous cellulose.

BACKGROUND ART

Cellulose fibers have been conventionally widely used for clothing or absorbent articles, paper products, etc. As for the cellulose fibers, in addition to fibrous cellulose whose fiber diameter is 10 µm to 50 µm, ultrafine fibrous cellulose whose fiber diameter is 1 µm or less is also known. The ultrafine fibrous cellulose is drawing attention as a new material, and its use extends over many fields.

In some cases, ultrafine fibrous cellulose is used as, for example, an additive of paint. In this case, the ultrafine fibrous cellulose may function as a viscosity modifier in the paint. For example, Patent Document 1 discloses a luster pigment dispersion containing water, a viscosity modifier (A) and a scaly luster pigment (B). In addition, Patent Document 2 discloses a luster pigment dispersion containing water, a scaly aluminum pigment, and a cellulose-based viscosity modifier. In Patent Documents 1 and 2, the use of cellulose nanofibers as a viscosity modifier was examined.

CITATION LIST

Patent Literature

PTL 1: WO 2018/012014
PTL 2: WO 2017/175468

SUMMARY OF INVENTION

Technical Problem

Cellulose nanofibers have been conventionally used for the purpose of enhancing the dispersibility of a pigment, etc. in paint. However, with regard to such paint, attention has not been paid to a decrease of coating suitability, which is caused by a viscosity change (thixotropy) due to application of shear before coating, and thus, there is room for improvement in coating suitability.

Therefore, in order to solve these problems of a related art, the present inventors have conducted studies for the purpose of providing ultrafine fibrous cellulose capable of exhibiting excellent coating suitability when added to paint.

Solution to Problem

The present inventors have conducted intensive studies in order to solve the above-mentioned problems, and as a result, they have obtained ultrafine fibrous cellulose in which when a dispersion liquid is obtained by dispersing the ultrafine fibrous cellulose in water and is stirred under predetermined conditions, a viscosity change rate (%) before/after stirring can be set within a predetermined range, and have found that it is possible to increase the coating suitability of paint when the corresponding ultrafine fibrous cellulose is added to the paint.

Specifically, the present invention has the following configuration.

[1] Fibrous cellulose having a fiber width of 1,000 nm or less, wherein when the fibrous cellulose is dispersed in water to form a dispersion liquid having a viscosity of 2,500 mPa·s at 23° C., and the dispersion liquid is stirred under following stirring conditions, a viscosity change rate falls within ±50% as calculated by the following formula:

$$\text{viscosity change rate (\%)} = (\text{viscosity after stirring} - \text{viscosity before stirring})/\text{viscosity before stirring} \times 100$$

(Stirring Conditions)

The dispersion liquid having the viscosity of 2,500 mPa·s at 23° C. is put in a cylindrical container having a diameter of 10 cm, to a height of 5 cm, and is stirred at 23° C. for 24 h by using an elliptical stirrer having a length of 5 cm, a width of 2 cm at the center, and a width of 1 cm at the end while a 2 cm-recessed state at the center of a liquid surface is maintained.

[2] The fibrous cellulose according to [1], wherein a degree of polymerization of the fibrous cellulose is 300 or more and 500 or less.

[3] The fibrous cellulose according to [1] or [2], wherein the fibrous cellulose has ionic substituents.

[4] The fibrous cellulose according to [3], wherein an amount of the ionic substituents in the fibrous cellulose is 0.10 mmol/g or more and 1.50 mmol/g or less.

[5] The fibrous cellulose according to [3] or [4], wherein the ionic substituents are phosphoric acid groups or substituents derived from the phosphoric acid groups.

[6] The fibrous cellulose according to [3] or [4], the ionic substituents are phosphorous acid groups or substituents derived from the phosphorous acid groups.

[7] The fibrous cellulose according to any of [1] to [6], wherein when the dispersion liquid with 0.4% by mass of the fibrous cellulose is formed through dispersion in water, the viscosity of the dispersion liquid at 23° C. is 200 mPa·s or more and 3,000 mPa·s or less.

[8] The fibrous cellulose according to any of [1] to [7], which is used for paint.

[9] A fibrous cellulose dispersion liquid obtained by dispersing the fibrous cellulose according to any of [1] to [8] in water.

[10] A method of producing fibrous cellulose, the method including:
obtaining the fibrous cellulose having a fiber width of 1,000 nm or less by performing a defibration treatment on cellulose fibers; and performing a thixotropy reduction treatment on the fibrous cellulose.

[11] The method of producing fibrous cellulose according to [10], wherein the performing of the thixotropy reduction treatment is setting a degree of polymerization of the fibrous cellulose to 300 or more and 500 or less.

[12] The method of producing fibrous cellulose according to [10] or [11], wherein the performing of the thixotropy reduction treatment is an ozone treatment step.

[13] The method of producing fibrous cellulose according to any of [1] to [12], further including: introducing ionic substituents into the cellulose fibers before the obtaining of the fibrous cellulose.

[14] The fibrous cellulose according to [13], wherein the introducing of the ionic substituents is introducing phosphoric acid groups or substituents derived from the phosphoric acid groups.

[15] The fibrous cellulose according to [13], wherein the introducing of the ionic substituents is introducing phosphorous acid groups or substituents derived from the phosphorous acid groups.

Advantageous Effects of Invention

According to the present invention, it is possible to obtain ultrafine fibrous cellulose capable of exhibiting excellent coating suitability when added to paint.

BRIEF DESCRIPTION OF DRAWINGS

FIG. 1 is a graph illustrating the relationship between pH and the amount of NaOH added dropwise to a fibrous cellulose-containing slurry having a phosphorus oxoacid group; and FIG. 2 is a graph illustrating the relationship between pH and the amount of NaOH added dropwise to a fibrous cellulose-containing slurry having a carboxy group.

DESCRIPTION OF EMBODIMENTS

Hereinafter, the present invention will be described in detail. Descriptions on constituent elements described below may be made on the basis of typical embodiments or specific examples, but the present invention is not limited to such embodiments.

(Ultrafine Fibrous Cellulose)

The present invention relates to fibrous cellulose having a fiber width of 1,000 nm or less. In this specification, the fibrous cellulose having a fiber width of 1,000 nm or less is also called ultrafine fibrous cellulose. Here, when the fibrous cellulose of the present invention is dispersed in water to form a dispersion liquid having a viscosity of 2,500 mPa·s at 23° C., and the corresponding dispersion liquid is stirred under following stirring conditions, a viscosity change rate falls within ±50% as calculated by the following formula.

viscosity change rate (%)=(viscosity after stirring−viscosity before stirring)/viscosity before stirring×100

(Stirring Conditions)

The dispersion liquid having a viscosity of 2,500 mPa·s at 23° C. is put in a cylindrical container having a diameter of 10 cm, to a height of 5 cm, and is stirred at 23° C. for 24 h by using an elliptical stirrer having a length of 5 cm, a width of 2 cm at the center, and a width of 1 cm at the end while a 2 cm-recessed state at the center of a liquid surface is maintained.

In the present invention, when ultrafine fibrous cellulose is formed into a dispersion liquid, and the viscosity change rate is set within ±50% in a case where stirring is performed under the conditions, ultrafine fibrous cellulose capable of exhibiting excellent coating suitability when added to paint is obtained. The dispersion liquid in which the ultrafine fibrous cellulose of the present invention is dispersed has low thixotropy, and thus, can exhibit excellent coating suitability. For example, even when paint containing the ultrafine fibrous cellulose of the present invention is stored or transported, since the viscosity change of the paint is suppressed, sagging during coating may be suppressed, and sedimentation of additives such as a pigment may be suppressed. In addition, even when the paint containing the ultrafine fibrous cellulose of the present invention is stirred for a long time so that relatively strong shear is applied to the paint, sagging caused by a viscosity decrease of the paint or sedimentation of additives such as a pigment can be effectively suppressed.

It is desirable that the ultrafine fibrous cellulose of the present invention is used for paint, and as described above, the coating suitability of the paint can be improved. In addition, when the ultrafine fibrous cellulose of the present invention is used as an additive of the paint, the design or the strength after coating can also be improved. Thus, a coating layer formed by applying the paint can exhibit an excellent design or a scratch resistance.

The viscosity change rate of the dispersion liquid, which is calculated by the formula only has to be within ±50%, preferably within ±40%, more preferably within ±30%, still more preferably within ±25%, particularly preferably within ±20%. The viscosity change rate of the dispersion liquid, which is calculated by the formula, may be 0%. In general, in many cases, the viscosity of the dispersion liquid is decreased due to application of shear to the dispersion liquid. Thus, the viscosity change rate calculated by the formula often becomes a negative value. That is, the viscosity change rate of the dispersion liquid is preferably −50% to 0%, more preferably −40% to 0%, still more preferably −30% to 0%, still more preferably −25% to 0%, particularly preferably −20% to 0%. The viscosity change rate of the dispersion liquid, which is calculated by the formula, is achieved by individually controlling, for example, the type or the condition of the treatment for the ultrafine fibrous cellulose, the degree of polymerization of the ultrafine fibrous cellulose, the amount of ionic substituents of the ultrafine fibrous cellulose, and the like, within appropriate ranges.

In this specification, the viscosity before/after stirring, which is used for calculating the viscosity change rate of the dispersion liquid, is a viscosity value 1 min after the start of measurement using a B-type viscometer at 23° C. at a rotation speed of 6 rpm. Examples of the B-type viscometer include an analog viscometer T-LVT manufactured by BLOOKFIELD. Since the viscosity before stirring is a viscosity of the dispersion liquid whose viscosity is adjusted to become about 2,500 mPa·s, it is desirable that an actually measured value of the viscosity of the dispersion liquid becomes 2,500 mPa·s. However, an error of about ±15% may occur. That is, in the calculation formula of the viscosity change rate, the viscosity before stirring is an actually measured viscosity of the dispersion liquid whose viscosity is adjusted to become about 2,500 mPa·s, and is an actually measured viscosity value 1 min after the start of measurement using the B-type viscometer at 23° C. at a rotation speed of 6 rpm. Meanwhile, when the viscosity before stirring is measured, an ultrafine fibrous cellulose dispersion liquid is put in a cylindrical container having a diameter of 10 cm to a height of 5 cm, and is stirred by a disperser at 1500 rpm for 5 min, and then measurement is performed 1 min after the end of stirring. In addition, when the viscosity of the dispersion liquid before stirring is adjusted to about 2,500 mPa·s, the addition amount of ultrafine fibrous cellulose to be used is properly adjusted. For example, by adjusting the content of ultrafine fibrous cellulose to 0.3 to 3.0% by mass relative to the total mass of the dispersion liquid, the viscosity of the dispersion liquid before stirring may be adjusted to about 2,500 mPa·s.

In the calculation formula of the viscosity change rate, when the viscosity after stirring is measured, first, the dispersion liquid provided for measurement of the viscosity before stirring is further stirred by a stirrer. At this time, the dispersion liquid before stirring (the ultrafine fibrous cellulose dispersion liquid) is put in a cylindrical container having a diameter of 10 cm to a height of 5 cm, and is stirred for 24 h by using an elliptical stirrer having a length of 5 cm, a width of 2 cm at the center, and a width of 1 cm at the end while a 2 cm-recessed state at the center of a liquid surface is maintained. The temperature of the liquid during stirring is maintained at 23° C. Then, 1 min after the end of stirring, the viscosity is measured by using the B-type viscometer, and the viscosity value 1 min after the start of measurement at 23° C. at a rotation speed of 6 rpm is set as the viscosity after stirring.

When the dispersion liquid with 0.4% by mass of the ultrafine fibrous cellulose of the present invention is formed through dispersion in water, the viscosity of the dispersion liquid at 23° C. is preferably 200 mPa·s or more, more preferably 300 mPa·s or more, still more preferably 350 mPa·s or more, particularly preferably 400 mPa·s or more. In addition, the viscosity of the dispersion liquid at 23° C. is preferably 3,000 mPa·s or less, more preferably 2,500 mPa·s or less. The viscosity of the dispersion liquid with an ultrafine fibrous cellulose concentration of 0.4% by mass may be measured by using the B-type viscometer (manufactured by BLOOKFIELD, an analog viscometer T-LVT). The measurement conditions are 23° C. and a rotation speed of 3 rpm, and the viscosity is measured 3 min after the start of measurement.

The fibrous cellulose of the present invention is ultrafine fibrous cellulose having a fiber width of 1,000 nm or less. The fiber width of the fibrous cellulose is more preferably 100 nm or less, still more preferably 8 nm or less.

The fiber width of the fibrous cellulose can be measured by, for example, observation with an electron microscope. The average fiber width of the fibrous cellulose is, for example, 1,000 nm or less. The average fiber width of the fibrous cellulose is preferably, for example, 2 nm or more and 1,000 nm or less, more preferably 2 nm or more and 100 nm or less, still more preferably 2 nm or more and 50 nm or less, particularly preferably 2 nm or more and 10 nm or less. When the average fiber width of the fibrous cellulose is set to be 2 nm or more, the dissolution as a cellulose molecule in water may be suppressed, so that the effect of improvement in the strength or rigidity, and the dimensional stability due to fibrous cellulose can be more easily exhibited. The fibrous cellulose is, for example, single fibrous cellulose.

The average fiber width of the fibrous cellulose is measured by using, for example, an electron microscope in the following manner. First, an aqueous suspension of fibrous cellulose with a concentration of 0.05% by mass or more and 0.1% by mass or less is prepared, and the suspension is cast on a hydrophilized carbon film-coated grid to obtain a sample for TEM observation. When fibers with a wide width are included, an SEM image of the surface cast on glass may be observed. Then, observation is performed through an electron microscope image at any of magnifications of ×1,000, ×5,000, ×10,000 and ×50,000 according to the width of fibers to be observed. Meanwhile, the sample, the observation conditions, and the magnification are adjusted to satisfy the following conditions.

(1) one straight line X is drawn at an arbitrary position within an observation image, and 20 or more fibers intersect the corresponding straight line X.

(2) a straight line Y perpendicularly intersecting the corresponding straight line is drawn within the same image, and 20 or more fibers intersect the corresponding straight line Y.

In regard to the observation images satisfying the conditions, widths of fibers intersecting the straight lines X and the straight lines Y are visually read. In this manner, three or more sets of observation images on at least surface portions that do not overlap each other are obtained. Next, for each image, widths of fibers intersecting the straight line X, and the straight line Y are read. Accordingly, at least 120 (=20×2×3) fiber widths are read. Then, the average value of the read fiber widths is set as an average fiber width of fibrous cellulose.

The fiber length of the fibrous cellulose is not particularly limited, but is, for example, preferably 0.1 μm or more and 1,000 μm or less, more preferably 0.1 μm or more and 800 μm or less, still more preferably 0.1 μm or more and 600 μm or less. When the fiber length is set within the above-mentioned range, destruction of a crystal region of the fibrous cellulose may be suppressed. In addition, it is also possible to set the slurry viscosity of the fibrous cellulose within an appropriate range. The fiber length of the fibrous cellulose may be obtained through, for example, image analysis by TEM, SEM, or AFM.

It is desirable that the fibrous cellulose has an I-type crystal structure. Here, the fact that the fibrous cellulose has the I-type crystal structure may be identified in a diffraction profile obtained from a wide-angle X-ray diffraction photograph using CuKα ($\lambda$=1.5418Å) monochromatized with graphite.

Specifically, identification may be made from typical peaks present at two positions around 2θ=14° or more and 17° or less and around 2θ=22° or more and 23° or less. The occupying ratio of the I-type crystal structure in the ultrafine fibrous cellulose is preferably, for example, 30% or more, more preferably 40% or more, still more preferably 50% or more. Accordingly, a more excellent performance may be expected in terms of a heat resistance and an occurrence of a low coefficient of linear thermal expansion. The degree of crystallinity may be obtained from a pattern in measurement of an X-ray diffraction profile, through a general method (Seagal et al, Textile Research Journal, vol 29, p 786, 1959).

The axial ratio (fiber length/fiber width) of the fibrous cellulose is not particularly limited, but is preferably, for example, 20 or more and 10,000 or less, more preferably 50 or more and 1,000 or less. By setting the axial ratio to the lower limit value or more, it is easy to form a sheet containing the ultrafine fibrous cellulose. In addition, it is easy to obtain a sufficient viscosity thickening property when a solvent dispersion is produced. Setting the axial ratio to the upper limit value or less is preferable because, for example, handling such as dilution becomes easy when the fibrous cellulose is treated as an aqueous dispersion liquid.

The fibrous cellulose in the present embodiment has, for example, both a crystalline region and a non-crystalline region. In particular, the ultrafine fibrous cellulose that has both a crystalline region and a non-crystalline region, and has a high axial ratio is realized by an ultrafine fibrous cellulose production method to be described below.

The fibrous cellulose in the present embodiment has, for example, at least one type of an ionic substituent and a non-ionic substituent. From the viewpoint of improving the dispersibility of fibers within a dispersion medium, and increasing the defibration efficiency in a defibration treatment, it is more preferable that the fibrous cellulose has an ionic substituent. The ionic substituent may include, for example, either or both of an anionic group and a cationic group. In addition, the non-ionic substituent may include, for example, an alkyl group and an acyl group. In the present embodiment, it is particularly preferable to have the anionic group as the ionic substituent.

The anionic group as the ionic substituent is preferably, for example, at least one type selected from a phosphorus oxoacid group or a substituent derived from the phosphorus oxoacid group (also simply referred to as a phosphorus oxoacid group), a carboxy group or a substituent derived from the carboxy group (also simply referred to as a carboxy group), and a sulfone group or a substituent derived from the sulfone group (also simply referred to as a sulfone group), more preferably at least one type selected from a phosphorus oxoacid group and a carboxy group, particularly preferably a phosphorus oxoacid group. The ultrafine fibrous cellulose having the phosphorus oxoacid group can exhibit a more excellent coating suitability when added to paint. The phosphorus oxoacid group or the substituent derived from the phosphorus oxoacid group may be a phosphorous acid group or a substituent derived from the phosphorous acid group, or a phosphoric acid group or a substituent derived from the phosphoric acid group.

In this specification, the phosphorous acid group or the substituent derived from the phosphorous acid group is, for example, a substituent represented by the following formula (2).

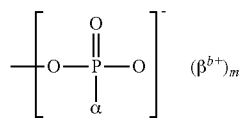

(2)

In the formula (2), b is a natural number, m is an arbitrary number, and b×m=1. α is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, an aromatic group, or groups derived therefrom. Among them, α is particularly preferably a hydrogen atom. α in the formula (2) does not include a group derived from a cellulose molecular chain.

Examples of the saturated-linear hydrocarbon group represented by α in the formula (2) include a methyl group, an ethyl group, an n-propyl group, and an n-butyl group, but are not particularly limited. Examples of the saturated-branched hydrocarbon group include an i-propyl group and a t-butyl group, but are not particularly limited. Examples of the saturated-cyclic hydrocarbon group include a cyclopentyl group and a cyclohexyl group, but are not particularly limited. Examples of the unsaturated-linear hydrocarbon group include a vinyl group and an allyl group, but are not particularly limited. Examples of the unsaturated-branched hydrocarbon group include an i-propenyl group and a 3-butenyl group, but are not particularly limited. Examples of the unsaturated-cyclic hydrocarbon group include a cyclopentenyl group and a cyclohexenyl group, but are not particularly limited. Examples of the aromatic group include a phenyl group and a naphthyl group, but are not particularly limited.

In addition, examples of the derived group in α include functional groups in which at least one type of functional groups such as a carboxy group, a hydroxy group, and an amino group is added or substituted in the main chain or the side chain of the various hydrocarbon groups, but are not particularly limited. In addition, the number of carbon atoms constituting the main chain of R is not particularly limited, but is preferably 20 or less, more preferably 10 or less. When the number of carbon atoms constituting the main chain of R is set within the range, the molecular weight of the phosphorous acid group may be set in an appropriate range, so that penetration into a fiber raw material may be facilitated, and the yield of ultrafine cellulose fibers may be increased.

$\beta^{b+}$ in the formula (2) is a monovalent or higher cation composed of an organic substance or an inorganic substance. Examples of the monovalent or higher cation composed of the organic substance include aliphatic ammonium, and aromatic ammonium, and examples of the monovalent or higher cation composed of the inorganic substance include ions of alkali metals such as sodium, potassium, or lithium, cations of divalent metals such as calcium or magnesium, and hydrogen ions, but are not particularly limited. For these, one type or a combination of two or more types may be applied. The monovalent or higher cation composed of the organic substance or the inorganic substance is preferably an ion of sodium or potassium which is hardly yellowed when the fiber raw material containing β is heated, and is easily industrially used, but is not particularly limited.

In addition, the phosphoric acid group or the group derived from the phosphoric acid group is, for example, a substituent represented by the following formula (1) or (3). The phosphoric acid group or the group derived from the phosphoric acid group may be a condensed phosphorus oxoacid group represented by the following formula (3).

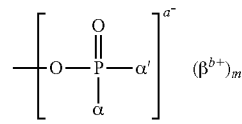

(1)

In the formula (1), a and b are natural numbers, and m is an arbitrary number (in which a=b×m). a of α and α' are O⁻, and the rest are OR. Here, R is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, an aromatic group, or groups derived therefrom. In addition, α in the formula (1) may be a group derived from a cellulose molecular chain.

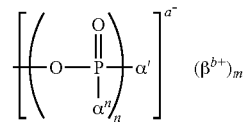

(3)

In the formula (3), a and b are natural numbers, m is an arbitrary number, and n is a natural number of 2 or more (in which a=b×m). a of $\alpha^1, \alpha^2, \ldots, \alpha^n$ and α' are O⁻, and the rest are either R or OR. Here, R is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, an aromatic group, or groups derived therefrom. α in the formula (3) may be a group derived from a cellulose molecular chain.

Specific examples of each group in the formulae (1) and (3) are the same as specific examples of each group in the formula (2). In addition, specific examples of $\beta^{b+}$ in the formulae (1) and (3) are the same as specific examples of $\beta^{b+}$ in the formula (2).

The fact that the ultrafine fibrous cellulose has a phosphorous acid group as a substituent may be confirmed by measuring an infrared absorption spectrum of a dispersion liquid containing the ultrafine fibrous cellulose, and observing the absorption based on P=O of a phosphonate group as a tautomer of the phosphorous acid group, around 1210 $cm^{-1}$. In addition, the fact that the fibrous cellulose has a phosphoric acid group as a substituent may be confirmed by measuring an infrared absorption spectrum of a dispersion liquid containing the fibrous cellulose, and observing the absorption based on P=O of the phosphoric acid group, around 1230 $cm^{-1}$. In addition, the fact that the fibrous cellulose has the phosphorous acid group or the phosphoric acid group as a substituent may be confirmed by a method of confirming a chemical shift by using NMR, a method of combining titration with elemental analysis or the like.

The amount of ionic substituents introduced into the fibrous cellulose is preferably, for example, 0.10 mmol/g or more per 1 g (mass) of the fibrous cellulose, more preferably 0.20 mmol/g or more, still more preferably 0.40 mmol/g or more, particularly preferably 0.60 mmol/g or more. In addition, the amount of ionic substituents introduced into the fibrous cellulose is preferably, for example, 3.65 mmol/g or less per 1 g (mass) of the fibrous cellulose, more preferably 3.00 mmol/g or less, still more preferably 2.50 mmol/g or less, yet more preferably 2.00 mmol/g or less, still more preferably 1.50 mmol/g or less, particularly preferably 1.00 mmol/g or less. Here, the denominator in the unit mmol/g indicates the mass of the fibrous cellulose when the counterion of the ionic substituent is a hydrogen ion ($H^+$). When the introduction amount of the ionic substituents is set within the range, it is possible to facilitate the micronizing of the fiber raw material, and to increase the stability of the fibrous cellulose. In addition, when the introduction amount of the ionic substituents is set within the range, it is possible to decrease the thixotropy of paint when the ultrafine fibrous cellulose is added to the paint, thereby more effectively increasing the coating suitability.

The amount of the ionic substituents introduced into the fibrous cellulose may be measured by, for example, a neutralization titration method. In the measurement using the neutralization titration method, while alkali such as a sodium hydroxide aqueous solution is added to the obtained fibrous cellulose-containing slurry, a change in pH is determined so that the introduction amount is measured.

FIG. 1 is a graph illustrating the relationship between pH and the amount of NaOH added dropwise to a fibrous cellulose-containing slurry having a phosphorus oxoacid group. For example, the amount of phosphorus oxoacid groups introduced into the fibrous cellulose is measured as follows.

First, the fibrous cellulose-containing slurry is treated with a strong acid ion exchange resin. As necessary, before the treatment with the strong acid ion exchange resin, the same defibration treatment as a defibration treatment step to be described below may be performed on a measurement target.

Next, the change in pH is observed while a sodium hydroxide aqueous solution is added, so that a titration curve illustrated in the upper part of FIG. 1 is obtained. On the titration curve illustrated in the upper part of FIG. 1, a measured pH is plotted relative to the addition amount of alkali, and on a titration curve illustrated in the lower part of FIG. 1, a pH increment (differential value) (1/mmol) is plotted relative to the addition amount of alkali. In this neutralization titration, on the curve plotting the measured pH relative to the addition amount of alkali, two points at which the increment (a differential value of pH relative to a dropping amount of alkali) is maximized are confirmed. Between these, a firstly obtained maximum point of the increment when alkali is added is called a first end point, and a secondly obtained maximum point of the increment is called a second end point. The amount of required alkali from the start of titration to the first end point is equal to a first dissociated acid amount of the fibrous cellulose contained in the slurry used for the titration, the amount of required alkali from the first end point to the second end point is equal to a second dissociated acid amount of the fibrous cellulose contained in the slurry used for the titration, and the amount of required alkali from the start of titration to the second end point is equal to the total dissociated acid amount of the fibrous cellulose contained in the slurry used for the titration. Then, a value obtained by dividing the amount of required alkali from the start of titration to the first end point by the solid content (g) in the slurry as a titration target becomes an introduction amount of the phosphorus oxoacid groups (mmol/g). Simple description as the introduction amount of the phosphorus oxoacid groups (or the amount of the phosphorus oxoacid groups) means the first dissociated acid amount.

In FIG. 1, a region from the start of titration to the first end point is called a first region, and a region from the first end point to the second end point is called a second region. For example, when the phosphorus oxoacid group is a phosphoric acid group, and the phosphoric acid group causes condensation, apparently, the amount of weak acid groups (also referred to as a second dissociated acid amount in this specification) in the phosphorus oxoacid group is decreased, and the amount of alkali required for the second region is smaller than the amount of alkali required for the first region. Meanwhile, the amount of strong acid groups (also referred to as a first dissociated acid amount in this specification) in the phosphorus oxoacid group is the same as the amount of phosphorus atoms regardless of the presence/absence of condensation. In addition, when the phosphorus oxoacid group is a phosphorous acid group, since there is no weak acid group in the phosphorus oxoacid group, the amount of alkali required for the second region may be decreased or the amount of alkali required for the second region may be zero in some cases. In this case, on the titration curve, there is one point at which a pH increment is maximized.

The above-described introduction amount of the phosphorus oxoacid groups (mmol/g) indicates the amount of the phosphorus oxoacid groups included in the acid-type fibrous cellulose (hereinafter, referred to as the amount of the phosphorus oxoacid groups (acid type)) because the denominator indicates the mass of acid-type fibrous cellulose. Meanwhile, when the counterion of the phosphorus oxoacid group is replaced with an arbitrary cation C so as to have a charge equivalent, the denominator may be converted into the mass of fibrous cellulose in which the corresponding cation C is a counterion so that it is possible to obtain the amount of the phosphorus oxoacid groups included in the fibrous cellulose in which the cation C is a counterion (hereinafter, the amount of the phosphorus oxoacid groups (C type)).

That is, calculation is performed by the following calculation formula.

Amount of phosphorus oxoacid groups (C type)=amount of phosphorus oxoacid groups (acid t e)/{1±(W−1)×A/1,000}

A [mmol/g]: the total amount of anions derived from phosphorus oxoacid groups included in fibrous cellulose (the total dissociated acid amount of phosphorus oxoacid groups)

W: formula weight of cation C per valence (for example, Na is 23, and Al is 9)

In the measurement of the amount of the phosphorus oxoacid groups through the titration method, if the dropping amount of one drop of the sodium hydroxide aqueous solution is too large, or if the titration interval is too short, the amount of the phosphorus oxoacid groups may be smaller than originally intended, that is, an accurate value may not be obtained. For an appropriate dropping amount, and a titration interval, for example, it is desirable to titrate 10 to 50 μL of a 0.1 N sodium hydroxide aqueous solution at a time for 5 to 30 sec. In addition, in order to eliminate the influence of carbon dioxide dissolved in the fibrous cellulose-containing slurry, for example, it is desirable to perform measurement while blowing inert gas such as nitrogen gas to the slurry from 15 min before the start of titration to the end of titration.

In addition, in a case where any or both of a phosphoric acid group, and a condensed phosphoric acid group is/are contained in addition to a phosphorous acid group, examples of a method of discerning from which of a phosphorous acid, a phosphoric acid, and a condensed phosphoric acid a detected phosphorus oxoacid is derived, include a method of performing processing of cutting a condensed structure, such as acid hydrolysis and then performing the above-described titration operation or a method of performing processing of converting a phosphorous acid group into a phosphoric acid group, such as oxidation treatment, and then, performing the above-described titration operation.

FIG. 3 is a graph illustrating the relationship between pH and the amount of NaOH added dropwise to a fibrous cellulose-containing dispersion liquid having a carboxy group as an ionic substituent. For example, the amount of carboxy groups introduced into the fibrous cellulose is measured as follows.

First, the fibrous cellulose-containing dispersion liquid is treated with a strong acid ion exchange resin. As necessary, before the treatment with the strong acid ion exchange resin, the same defibration treatment as a defibration treatment step to be described below may be performed on a measurement target.

Next, the change in pH is observed while a sodium hydroxide aqueous solution is added, so that a titration curve illustrated in the upper part of FIG. 3 is obtained. On the titration curve illustrated in the upper part of FIG. 3, a measured pH is plotted relative to the addition amount of alkali, and on a titration curve illustrated in the lower part of FIG. 3, a pH increment (differential value) (1/mmol) is plotted relative to the addition amount of alkali. In this neutralization titration, on the curve plotting the measured pH relative to the addition amount of alkali, one point at which the increment (a differential value of pH relative to a dropping amount of alkali) is maximized is confirmed. This maximum point is called a first end point. Here, a region from the start of titration to the first end point in FIG. 3 is called a first region. The amount of alkali required for the first region is equal to the amount of the carboxy groups in the dispersion liquid used for titration. Then, an introduction amount of the carboxy groups (mmol/g) is calculated by dividing the amount of alkali (mmol) required for the first region on the titration curve by the solid content (g) in the fibrous cellulose-containing dispersion liquid as a titration target.

The above-described introduction amount of the carboxy groups (mmol/g) indicates the amount of the carboxy groups included in the acid-type fibrous cellulose (hereinafter, referred to as the amount of the carboxy groups (acid type)) because the denominator is the mass of acid-type fibrous cellulose. Meanwhile, when the counterion of the carboxy group is replaced with an arbitrary cation C so as to have a charge equivalent, the denominator may be converted into the mass of fibrous cellulose in which the corresponding cation C is a counterion so that it is possible to obtain the amount of the carboxy groups included in the fibrous cellulose in which the cation C is a counterion (hereinafter, the amount of the carboxy groups (C type)). That is, calculation is performed by the following calculation formula.

Amount of carboxy groups(C type)=amount of carboxy groups(acid type)/{1+(W−1)×(amount of carboxy groups(acid type))/1,000}

W: formula weight of cation C per valence (for example, Na is 23, and Al is 9)

In the measurement of the amount of ionic substituents through the titration method, if the dropping amount of one drop of the sodium hydroxide aqueous solution is too large, or if the titration interval is too short, the amount of the ionic substituents may become smaller than originally intended, that is, an accurate value may not be obtained. For an appropriate dropping amount, and a titration interval, for example, it is desirable to titrate 10 to 50 μL of a 0.1 N sodium hydroxide aqueous solution at a time for 5 to 30 sec. In addition, in order to eliminate the influence of carbon dioxide dissolved in the fibrous cellulose-containing slurry, for example, it is desirable to perform measurement while blowing inert gas such as nitrogen gas to the slurry from 15 min before the start of titration to the end of titration.

The degree of polymerization of the ultrafine fibrous cellulose is preferably 300 or more, more preferably 320 or more, still more preferably 340 or more. In addition, the degree of polymerization of the ultrafine fibrous cellulose is preferably 500 or less, more preferably 490 or less, still more preferably 460 or less. When the degree of polymerization of the ultrafine fibrous cellulose is set within the range, it is possible to decrease the thixotropy of paint (thixotropy reduction) when the ultrafine fibrous cellulose is added to the paint. Accordingly, it is possible to increase the coating suitability more effectively.

The degree of polymerization of the ultrafine fibrous cellulose is a value calculated from a pulp viscosity measured according to Tappi T230. Specifically, after measurement is performed on a viscosity (referred to as η1) measured when the ultrafine fibrous cellulose as a measurement target is dispersed in a copper ethylenediamine aqueous solution, and a blank viscosity (referred to as η0) measured by only a dispersion medium, a specific viscosity (ηsp), and an intrinsic viscosity ([η]) are measured according to the following formulae.

$$\eta sp=(\eta1/\eta0)-1$$

$$[\eta]=\eta sp/(c(1+0.28\times\eta sp))$$

Here, c in the formula indicates a concentration of the ultrafine fibrous cellulose at the time of the viscosity measurement.

Further, the degree of polymerization (DP) is calculated from the following formula.

$$DP=1.75\times[\eta]$$

This degree of polymerization is an average degree of polymerization measured according to a viscosity method, and thus may be referred to as a "viscosity average degree of polymerization."

In the present invention, in particular, by setting the degree of polymerization of the ultrafine fibrous cellulose to 300 or more and 500 or less, and setting the amount of ionic substituents in the ultrafine fibrous cellulose to 0.4 mmol/g or more and 1.0 mmol/g or less, it is possible to further decrease the thixotropy of paint when the ultrafine fibrous cellulose is added to the paint, thereby more effectively increasing the coating suitability of the paint. It may be thought that setting the degree of polymerization of the ultrafine fibrous cellulose and the amount of the ionic substituents within appropriate ranges contributes to low thixotropy that is exhibited by a dispersion liquid in which the ultrafine fibrous cellulose is dispersed, which increases the coating suitability of the paint.

(Method of Producing Ultrafine Fibrous Cellulose)
<Fiber Raw Material>

Ultrafine fibrous cellulose is produced by a cellulose-containing fiber raw material. The cellulose-containing fiber raw material is not particularly limited, but pulp is preferably used because it is easily available and inexpensive. Examples of the pulp include wood pulp, non-wood pulp, and deinked pulp. The wood pulp is not particularly limited, but examples thereof include chemical pulps such as broad leaved tree kraft pulp (LBKP), needle leaved tree kraft pulp (NBKP), sulfite pulp (SP), dissolving pulp (DP), soda pulp (AP), unbleached kraft pulp (UKP) and oxygen bleached kraft pulp (OKP), semi-chemical pulps such as semi-chemical pulp (SCP) and chemigroundwood pulp (COP), and mechanical pulps such as ground wood pulp (GP) and thermo-mechanical pulp (TMP, BCTMP). The non-wood pulp is not particularly limited, but examples thereof include cotton-based pulps such as cotton linter and cotton lint, and non-wood-based pulps such as hemp, straw and bagasse. The deinked pulp is not particularly limited, but examples thereof include deinked pulp whose raw material is used paper. The pulp in the present embodiment may be used alone or in mixture of two or more thereof. Among the pulps, from the viewpoint of ease of availability, for example, wood pulp and deinked pulp are preferable. In addition, among the wood pulps, from the viewpoint of a high cellulose ratio and a high yield of ultrafine fibrous cellulose during a defibration treatment, and from the viewpoint of obtaining ultrafine fibrous cellulose of long fibers with a high axial ratio, in which decomposition of cellulose in pulp is low, for example, chemical pulp is more preferable, and kraft pulp and sulfite pulp are further preferable. When the ultrafine fibrous cellulose of long fibers with a high axial ratio is used, the viscosity tends to be increased.

Examples of the cellulose-containing fiber raw material include cellulose contained in ascidians or bacteria cellulose produced by acetic acid bacteria. In addition, instead of the cellulose-containing fiber raw material, fibers formed by linear nitrogen-containing polysaccharide polymers such as chitin and chitosan may also be used.

<Phosphorus Oxoacid Group Introducing Step>

When the ultrafine fibrous cellulose has a phosphorus oxoacid group, the step of producing the ultrafine fibrous cellulose includes a phosphorus oxoacid group introducing step as an ionic substituent introducing step. The phosphorus oxoacid group introducing step is a step in which at least one type of compound selected from compounds capable of introducing a phosphorus oxoacid group by reacting with a hydroxy group included in the cellulose-containing fiber raw material (hereinafter, also referred to as a "compound A") is allowed to act on the cellulose-containing fiber raw material. Through this step, phosphorus oxoacid group-introduced fibers are obtained. The ionic substituent introducing step is preferably a phosphoric acid group introducing step or a phosphorous acid group introducing step.

In the phosphorus oxoacid group introducing step according to the present embodiment, the reaction between the cellulose-containing fiber raw material and the compound A may be performed in the presence of at least one type (hereinafter, also referred to as a "compound B") selected from urea and its derivatives. Meanwhile, in a state where the compound B is not present, the reaction between the cellulose-containing fiber raw material and the compound A may be performed.

Examples of a method of allowing the compound A to act on the fiber raw material in the coexistence with the compound B, include a method of mixing the compound A and the compound B with the fiber raw material in a dry state, a wet state or a slurry state. Among them, in terms of high uniformity of the reaction, it is preferable to use the fiber raw material in a dry state or a wet state, and it is particularly preferable to use the fiber raw material in a dry state. The form of the fiber raw material is not particularly limited, but is preferably, for example, cotton-like or thin sheet-like. A method may be exemplified in which each of the compound A and the compound B, in a powder state or in a state of a solution obtained through dissolution in a solvent or in a melted state made through heating to a melting point or higher, is added to the fiber raw material. Among them, in terms of high uniformity of the reaction, addition in a state of a solution obtained through dissolution in a solvent, in particular, in an aqueous solution state, is preferable. In addition, the compound A and the compound B may be added to the fiber raw material at the same time, may be individually separately added, or may be added as a mixture. The method of adding the compound A and the compound B is not particularly limited, but when the compound A and the compound B are in a solution state, the fiber raw material may be immersed in the solution to absorb the liquid and then may be taken out, or the solution may be added dropwise to the fiber raw material. In addition, required amounts of the compound A and the compound B may be added to the fiber raw material, or after excess amounts of the compound A and the compound B are separately added to the fiber raw material, the excess compound A and compound B may be removed through pressing or filtering.

Examples of the compound A used in the present embodiment include a compound that has a phosphorus atom, and is capable of forming an ester bond with cellulose may be exemplified, and specific examples thereof include phosphoric acid or a salt thereof, phosphorous acid or a salt thereof, dehydrated condensed phosphoric acid or a salt thereof, and phosphoric anhydride (diphosphorus pentoxide), but are not particularly limited. Examples of the phosphoric acid include those having various purities, for example, 100% phosphoric acid (orthophosphoric acid) or 85% phosphoric acid. Examples of the phosphorous acid include 99% phosphorous acid (phosphonic acid). The dehydrated condensed phosphoric acid is obtained by condensing two or more molecules of the phosphoric acid through a dehydration reaction, and examples thereof include pyrophosphoric acid, and polyphosphoric acid. Examples of phosphate, phosphite, and dehydrated condensed phosphate include lithium salts, sodium salts, potassium salts, and ammonium salts of phosphoric acid, phosphorous acid or dehydrated condensed phosphoric acid, and these may have various degrees of neutralization. Among them, from the viewpoint of easier improvement in the defibration efficiency in a defibration step to be described below, a low cost and an ease of industrial applicability due to high introduction efficiency of the phosphorus oxoacid group, phosphoric acid, a sodium salt of phosphoric acid, a potassium salt of phosphoric acid, an ammonium salt of phosphoric acid, and phosphorous acid, a sodium salt of phosphorous acid, a potassium salt of phosphorous acid, or an ammonium salt of phosphorous acid are preferable, and phosphoric acid, sodium dihydrogen phosphate, disodium hydrogen phosphate, ammonium dihydrogen phosphate, phosphorous acid, and sodium hydrogen phosphite are more preferable.

The amount of the compound A added to the fiber raw material is not particularly limited, but, for example, in a case where the addition amount of the compound A is converted into a phosphorus atomic weight, the amount of phosphorus atoms added to the fiber raw material (absolute dry mass) is preferably 0.5% by mass or more and 100% by mass or less, more preferably 1% by mass or more and 50% by mass or less, still more preferably 2% by mass or more and 30% by mass or less. When the amount of phosphorus atoms added to the fiber raw material is set within the range, the yield of the ultrafine fibrous cellulose can be further improved. Meanwhile, when the amount of phosphorus atoms added to the fiber raw material is set to the upper limit value or less, a yield improving effect and a cost can be balanced.

As described above, the compound B used in the present embodiment is at least one type selected from urea and its derivatives. Examples of the compound B include urea, biuret, 1-phenylurea, 1-benzylurea, 1-methylurea, and 1-ethylurea. From the viewpoint of improving the uniformity of a reaction, it is preferable to use the compound B as an aqueous solution. In addition, from the viewpoint of further improving the uniformity of a reaction, it is preferable to use an aqueous solution in which both the compound A and the compound B are dissolved.

The amount of the compound B added to the fiber raw material (absolute dry mass) is not particularly limited, but is preferably, for example, 1% by mass or more and 500% by mass or less, more preferably 10% by mass or more and 400% by mass or less, still more preferably 100% by mass or more and 350% by mass or less.

In the reaction between the cellulose-containing fiber raw material and the compound A, in addition to the compound B, for example, amides or amines may be included in the reaction system. Examples of the amides include formamide, dimethylformamide, acetamide, and dimethylacetamide. Examples of the amines include methylamine, ethylamine, trimethylamine, triethylamine, monoethanolamine, diethanolamine, triethanolamine, pyridine, ethylenediamine, and hexamethylenediamine. Among them, especially, triethylamine is known to act as a good reaction catalyst.

In the phosphorus oxoacid group introducing step, it is desirable that after the compound A, etc. are added or mixed to/with the fiber raw material, a heat treatment is carried out on the corresponding fiber raw material. It is desirable that as for the heat treatment temperature, a temperature at which a thermal decomposition or a hydrolysis reaction of fibers can be suppressed while the phosphorus oxoacid group can be efficiently introduced is selected. The heat treatment temperature is preferably, for example, 50° C. or more and 300° C. or less, more preferably 100° C. or more and 250° C. or less, still more preferably 130° C. or more and 200° C. or less. In addition, for the heat treatment, devices having various heat media may be used, and, for example, a stirring drying device, a rotary drying device, a disk drying device, a roll-type heating device, a plate-type heating device, a fluidized bed drying device, an air flow drying device, a vacuum-drying device, an infrared heating device, a far-infrared heating device, a microwave heating device, or a high-frequency drying device may be used.

In the heat treatment according to the present embodiment, it is possible to employ, for example, a method of performing heating after adding the compound A to a thin sheet-like fiber raw material through a method such as impregnation, or a method of performing heating while kneading or stirring the fiber raw material and the compound A by a kneader or the like. This makes it possible to suppress an unevenness of the concentration of the compound A in the fiber raw material, and to more uniformly introduce the phosphorus oxoacid groups onto the surfaces of cellulose fibers included in the fiber raw material. It may be thought that this is because as the drying is performed, when water molecules move to the surface of the fiber raw material, the dissolved compound A can be suppressed from being attracted to the water molecules by surface tension, and similarly moving to the surface of the fiber raw material (that is, unevenness of the concentration of the compound A is caused).

In addition, it is desirable that the heating device used for the heat treatment is, for example, a device capable of always discharging the water content retained by the slurry, and the water content produced according to a dehydration condensation (phosphate esterification) reaction between the compound A and a hydroxy group, etc. included in cellulose, etc. in the fiber raw material, to the outside of a device system. Examples of such a heating device include a blowing-type oven. By always discharging the water content within the device system, not only a hydrolysis reaction of a phosphoric acid ester bond, as a reverse reaction of phosphate esterification, can be suppressed, but also acid hydrolysis of a sugar chain within fibers can be suppressed. This makes it possible to obtain ultrafine fibrous cellulose with a high axial ratio.

The time for the heat treatment is preferably, for example, 1 sec or more and 300 min or less after the water content is substantially removed from the fiber raw material, more preferably 1 sec or more and 1,000 sec or less, still more preferably 10 sec or more and 800 sec or less. In the present embodiment, when the heating temperature and the heating time are set within appropriate ranges, the introduction amount of the phosphorus oxoacid groups may be set within a preferable range.

The phosphorus oxoacid group introducing step only has to be performed at least once, but may be repeatedly performed twice or more. By performing the phosphorus oxoacid group introducing step twice or more, it is possible to introduce many phosphorus oxoacid groups into the fiber raw material. In the present embodiment, as an example of a preferred embodiment, there is a case where the phosphorus oxoacid group introducing step is performed twice.

The amount of the phosphorus oxoacid groups introduced into the fibrous cellulose is preferably, for example, 0.10 mmol/g or more per 1 g (mass) of the ultrafine fibrous cellulose, more preferably 0.20 mmol/g or more, still more preferably 0.40 mmol/g or more, particularly preferably 0.60 mmol/g or more. In addition, the amount of the phosphorus oxoacid groups introduced into the fibrous cellulose is preferably, for example, 3.65 mmol/g or less per 1 g (mass) of the ultrafine fibrous cellulose, more preferably 3.00 mmol/g or less, still more preferably 2.50 mmol/g or less, yet more preferably 2.00 mmol/g or less, still more preferably 1.50 mmol/g or less, particularly preferably 1.00 mmol/g or less. When the introduction amount of the phosphorus oxoacid groups is set within the range, it is possible to facilitate the micronizing of the fiber raw material and to increase the stability of the ultrafine fibrous cellulose. In addition, when the introduction amount of the ionic substituents is set within the range, it is possible to decrease the thixotropy of paint when the ultrafine fibrous cellulose is added to the paint, thereby more effectively increasing the coating suitability.

<Carboxy Group Introducing Step>

When the ultrafine fibrous cellulose has a carboxy group, the step of producing the ultrafine fibrous cellulose includes a carboxy group introducing step. The carboxy group introducing step is performed by subjecting the cellulose-containing fiber raw material to oxidation treatment such as ozone oxidation, oxidation using a Fenton method, or a TEMPO oxidation treatment, or treatment with a compound having a carboxylic acid-derived group or its derivative, or an acid anhydride of a compound having a carboxylic acid-derived group or its derivative.

The compound having the carboxylic acid-derived group is not particularly limited, but examples thereof include dicarboxylic acid compounds such as maleic acid, succinic acid, phthalic acid, fumaric acid, glutaric acid, adipic acid, and itaconic acid, or tricarboxylic acid compounds such as citric acid, and aconitic acid. In addition, the derivative of the compound having the carboxylic acid-derived group is not particularly limited, but examples thereof include imidization products of an acid anhydride of a compound having a carboxy group, and derivatives of an acid anhydride of a compound having a carboxy group. The imidization product of the acid anhydride of the compound having the carboxy group is not particularly limited, but examples thereof include imidization products of dicarboxylic acid compounds, such as maleimide, succinimide, and phthalimide.

The acid anhydride of the compound having the carboxylic acid-derived group is not particularly limited, but examples thereof include acid anhydrides of dicarboxylic acid compounds, such as maleic anhydride, succinic anhydride, phthalic anhydride, glutaric anhydride, adipic anhydride, and itaconic anhydride. In addition, the derivative of the acid anhydride of the compound having the carboxylic acid-derived group is not particularly limited, but examples thereof include those in which at least a part of hydrogen atoms of the acid anhydride of the compound having the carboxy group is substituted with a substituent such as an alkyl group or a phenyl group, such as dimethylmaleic anhydride, diethylmaleic anhydride, or diphenylmaleic anhydride.

In the carboxy group introducing step, when the TEMPO oxidation treatment is performed, for example, it is desirable to perform the treatment under conditions where pH is 6 or more and 8 or less. Such a treatment is also called a neutral TEMPO oxidation treatment. The neutral TEMPO oxidation treatment may be performed by adding, for example, pulp as the fiber raw material, a nitroxy radical such as TEMPO (2,2,6,6-tetramethylpiperidine-1-oxyl) as a catalyst, and sodium hypochlorite as a sacrificial reagent, to sodium phosphate buffer (pH=6.8). In addition, through coexistence with sodium chlorite, aldehyde generated in the oxidation process can be efficiently oxidized to a carboxy group.

In addition, in the TEMPO oxidation treatment, the treatment may be performed under conditions where pH is 10 or more and 11 or less. Such a treatment is also called an alkali TEMPO oxidation treatment. The alkali TEMPO oxidation treatment may be performed by adding, for example, a nitroxy radical such as TEMPO as a catalyst, sodium bromide as a co-catalyst, and sodium hypochlorite as an oxidant, to pulp as the fiber raw material.

The amount of carboxy groups introduced into the fibrous cellulose changes depending on the type of the substituent, and is preferably 0.10 mmol/g or more per 1 g (mass) of the ultrafine fibrous cellulose, more preferably 0.20 mmol/g or more, still more preferably 0.40 mmol/g or more, particularly preferably 0.60 mmol/g or more, for example, in a case where the carboxy groups are introduced through TEMPO oxidation. In addition, the amount of carboxy groups introduced into the fibrous cellulose is preferably 2.50 mmol/g or less, more preferably 2.00 mmol/g or less, still more preferably 1.50 mmol/g or less, particularly preferably 1.00 mmol/g or less. Otherwise, when the substituent is a carboxymethyl group, it may be 5.8 mmol/g or less per 1 g (mass) of the ultrafine fibrous cellulose. When the introduction amount of the carboxy groups is set within the range, it is possible to facilitate the micronizing of the fiber raw material, and to increase the stability of the fibrous cellulose. In addition, when the introduction amount of the carboxy groups is set within the range, it is possible to decrease the thixotropy of paint when the ultrafine fibrous cellulose is added to the paint, thereby more effectively increasing the coating suitability.

<Washing Step>

In the method of producing the ultrafine fibrous cellulose in the present embodiment, as necessary, a washing step may be performed on ionic substituent-introduced fibers. The washing step is performed by washing the ionic substituent-introduced fibers with, for example, water or an organic solvent. In addition, the washing step may be performed after each step to be described below, and the number of times washing carried out in each washing step is not particularly limited.

<Alkali Treatment Step>

When the ultrafine fibrous cellulose is produced, an alkali treatment may be performed on the fiber raw material between the ionic substituent introducing step, and a defibration treatment step to be described below. The method for the alkali treatment is not particularly limited, but, for example, a method of immersing the ionic substituent-introduced fibers in an alkali solution may be exemplified.

An alkali compound contained in the alkali solution is not particularly limited, and may be an inorganic alkali compound or may be an organic alkali compound. In the present embodiment, it is desirable to use, for example, sodium hydroxide or potassium hydroxide as the alkali compound in terms of high versatility. In addition, a solvent contained in the alkali solution may be either water or an organic solvent. Among them, the solvent contained in the alkali solution is preferably a polar solvent, including water, or a polar organic solvent, (for example, alcohol), more preferably an aqueous solvent including at least water. As the alkali solution, in terms of high versatility, for example, a sodium hydroxide aqueous solution, or a potassium hydroxide aqueous solution is preferable.

The temperature of the alkali solution in the alkali treatment step is not particularly limited, but is preferably, for example, 5° C. or more and 80° C. or less, more preferably 10° C. or more and 60° C. or less. The immersion time of the ionic substituent-introduced fibers in the alkali solution in the alkali treatment step is not particularly limited, but is preferably, for example, 5 min or more and 30 min or less, more preferably 10 min or more and 20 min or less. The use amount of the alkali solution in the alkali treatment is not particularly limited, but is preferably, for example, 100% by mass or more and 100,000% by mass or less relative to the absolute dry mass of the ionic substituent-introduced fibers, more preferably 1,000% by mass or more and 10,000% by mass or less.

In order to reduce the use amount of the alkali solution in the alkali treatment step, the ionic substituent-introduced fibers may be washed with water or an organic solvent after the ionic substituent introducing step before the alkali treatment step. After the alkali treatment step, before the defibration treatment step, from the viewpoint of improving handleability, it is desirable that the ionic substituent-introduced fibers which have been subjected to the alkali treatment are washed with water or an organic solvent.

<Acid Treatment Step>

When the ultrafine fibrous cellulose is produced, an acid treatment may be performed on the fiber raw material between the ionic substituent introducing step, and the defibration treatment step to be described below. For example, the ionic substituent introducing step, the acid treatment, the alkali treatment and the defibration treatment may be performed in this order.

The method for the acid treatment is not particularly limited, but, for example, a method of immersing the fiber raw material in an acid-containing acidic liquid may be exemplified. The concentration of the acidic liquid to be used is not particularly limited, but is preferably, for example, 10% by mass or less, more preferably 5% by mass or less. In addition, pH of the acidic liquid to be used is not particularly limited, but is preferably, for example, 0 or more and 4 or less, more preferably 1 or more and 3 or less. Examples of the acid contained in the acidic liquid include inorganic acid, sulfonic acid, and carboxylic acid. Examples of the inorganic acid include sulfuric acid, nitric acid, hydrochloric acid, hydrobromic acid, hydroiodic acid, hypochlorous acid, chlorous acid, chloric acid, perchloric acid, phosphoric acid, and boric acid. Examples of the sulfonic acid include methanesulfonic acid, ethanesulfonic acid, benzenesulfonic acid, p-toluenesulfonic acid, and trifluoromethanesulfonic acid. Examples of the carboxylic acid include formic acid, acetic acid, citric acid, gluconic acid, lactic acid, oxalic acid, and tartaric acid. Among them, it is particularly preferable to use hydrochloric acid or sulfuric acid.

The temperature of the acid solution in the acid treatment is not particularly limited, but is preferably, for example, 5° C. or more and 100° C. or less, more preferably 20° C. or more and 90° C. or less. The time of immersion in the acid solution in the acid treatment is not particularly limited, but is preferably, for example, 5 min or more and 120 min or less, more preferably 10 min or more and 60 min or less. The use amount of the acid solution in the acid treatment is not particularly limited, but is preferably, for example, 100% by mass or more and 100,000% by mass or less relative to the absolute dry mass of the fiber raw material, more preferably 1,000% by mass or more and 10,000% by mass or less.

<Defibration Treatment>

The ultrafine fibrous cellulose is obtained by defibering the ionic substituent-introduced fibers in the defibration treatment step. In the defibration treatment step, for example, a defibration treatment device may be used. The defibration treatment device is not particularly limited, but, for example, a high-speed defibrator, a grinder (a millstone-type crusher), a high-pressure homogenizer or an ultra-high-pressure homogenizer, a high-pressure collision-type crusher, a ball mill, a bead mill, a disc-type refiner, a conical refiner, a twin-screw kneader, a vibration mill, a homomixer under high-speed rotation, an ultrasonic disperser, a beater or the like may be used. Among the defibration treatment devices, it is more preferable to use a high-speed defibrator, a high-pressure homogenizer, or an ultra-high-pressure homogenizer which is less affected by a crushing medium and has a low risk of contamination.

In the defibration treatment step, for example, it is preferable that the ionic substituent-introduced fibers are diluted with a dispersion medium and then take a slurry form. The dispersion medium may include one type or two or more types selected from water, and organic solvents such as a polar organic solvent. The polar organic solvent is not particularly limited, but, for example, alcohols, polyhydric alcohols, ketones, ethers, esters, an aprotic polar solvent and the like are preferable. Examples of the alcohols include methanol, ethanol, isopropanol, n-butanol, and isobutylalcohol. Examples of the polyhydric alcohols include ethyleneglycol, propyleneglycol, and glycerin. Examples of the ketones include acetone, and methylethylketone (MEK). Examples of the ethers include diethylether, tetrahydrofuran, ethyleneglycolmonomethylether, ethylene glycolmonoethylether, ethylene glycolmono n-butylether, and propyleneglycolmonomethylether. Examples of the esters include ethyl acetate, and butyl acetate. Examples of the aprotic polar solvent include dimethylsulfoxide (DMSO), dimethylformamide (DMF), dimethylacetamide (DMAc), and N-methyl-2-pyrrolidinone (NMP).

The solid content concentration of the ultrafine fibrous cellulose at the time of the defibration treatment may be properly set. In addition, the slurry obtained by dispersing the ionic substituent-introduced fibers in the dispersion medium may contain, for example, any solid content other than the ionic substituent-introduced fibers, such as urea having a hydrogen bondability.

<Thixotropy Reduction Treatment>

It is desirable that the method of producing the ultrafine fibrous cellulose in the present invention includes a step of carrying out a thixotropy reduction treatment in addition to the above-described steps. Specifically, as described above, it is desirable to include a step of obtaining the fibrous cellulose with a fiber width of 1,000 nm or less by subjecting the properly treated cellulose fibers to the defibration treatment, and a step of performing the thixotropy reduction treatment on the fibrous cellulose. That is, it is desirable that the method of producing the ultrafine fibrous cellulose in the present invention includes, for example, a step of performing the thixotropy reduction treatment after the defibration treatment is performed on the cellulose fibers. Before the defibration treatment step, as described above, it is preferable to further include the step of introducing the ionic substituent into the cellulose fibers, and it is also preferable to further include the washing step or the alkali treatment step in addition to the step of introducing the ionic substituent.

In this specification, the step of performing the thixotropy reduction treatment is a step of performing a treatment for decreasing the thixotropy of a dispersion liquid containing the ultrafine fibrous cellulose. Specifically, the step of performing the thixotropy reduction treatment is preferably a step of setting the degree of polymerization of the fibrous cellulose with a fiber width of 1,000 nm or less, to 300 or more and 500 or less. The degree of polymerization of the ultrafine fibrous cellulose, which is obtained through the step of performing the thixotropy reduction treatment, is more preferably 320 or more, still more preferably 340 or more. In addition, the degree of polymerization of the ultrafine fibrous cellulose, which is obtained through the step of performing the thixotropy reduction treatment, is more preferably 490 or less, still more preferably 460 or less.

Examples of the step of performing the thixotropy reduction treatment include an ozone treatment step, an enzyme treatment step, a hypochlorous acid treatment step, and a sub-critical water treatment step.

The step of performing the thixotropy reduction treatment is preferably at least one type selected from an ozone treatment step, an enzyme treatment step, a hypochlorous acid treatment step, and a sub-critical water treatment step, particularly preferably an ozone treatment step.

In the ozone treatment step, ozone is added to an ultrafine fibrous cellulose dispersion liquid (slurry). When ozone is added, for example, addition as an ozone/oxygen mixed gas is preferable. Here, the ozone addition rate relative to 1 g of the ultrafine fibrous cellulose contained in the ultrafine fibrous cellulose dispersion liquid (slurry) is preferably set to $1.0 \times 10^{-4}$ g or more, more preferably set to $1.0 \times 10^{-3}$ g or more, still more preferably set to $1.0 \times 10^{-2}$ g or more. The ozone addition rate relative to 1 g of the ultrafine fibrous cellulose is preferably set to $1.0 \times 10^{1}$ g or less. It is desirable that the ultrafine fibrous cellulose dispersion liquid (slurry) is stirred under conditions of 10° C. or more and 50° C. or less for 10 sec or more and 10 min or less after ozone is added thereto, and then, is allowed to stand still for 1 min or more and 100 min or less.

In the enzyme treatment step, an enzyme is added to the ultrafine fibrous cellulose dispersion liquid (slurry). Here, the enzyme to be used is preferably a cellulase-based enzyme. The cellulase-based enzymes are classified into carbohydrate hydrolase families based on the higher-order structure of a catalyst domain having a cellulose hydrolysis reaction function. The cellulase-based enzymes are roughly classified into endo-glucanase and cellobiohydrolase according to cellulose decomposition characteristics. The endo-glucanase is highly hydrolyzable for an amorphous portion of cellulose or soluble cellooligosaccharides, or cellulose derivatives such as carboxymethylcellulose, and randomly cleaves their molecular chains from the inside, thereby decreasing the degree of polymerization. On the other hand, the cellobiohydrolase decomposes a crystalline portion of cellulose, thereby giving cellobiose. In addition, the cellobiohydrolase hydrolyzes a cellulose molecule from the end thereof, and thus is also called an exo-type or processive enzyme. The enzyme used in the enzyme treatment step is not particularly limited, but it is preferable to use endo-glucanase.

In the enzyme treatment step, the addition rate of the enzyme is preferably $1.0 \times 10^{-7}$ g or more relative to 1 g of the ultrafine fibrous cellulose, more preferably $1.0 \times 10^{-6}$ g or more, still more preferably $1.0 \times 10^{-5}$ g or more. In addition, the addition rate of the enzyme is preferably $1.0 \times 10^{-2}$ g or less relative to 1 g of the ultrafine fibrous cellulose. It is desirable that the ultrafine fibrous cellulose dispersion liquid (slurry) is stirred under conditions of 30° C. or more and 70° C. or less for 1 min or more and 10 h or less after the enzyme is added thereto, and then is put under conditions of 90° C. or more so as to inactivate the enzyme.

In the hypochlorous acid treatment step, sodium hypochlorite is added to the ultrafine fibrous cellulose dispersion liquid (slurry). The addition rate of the sodium hypochlorite is preferably $1.0 \times 10^{-4}$ g or more relative to 1 g of the ultrafine fibrous cellulose, more preferably $1.0 \times 10^{-3}$ g or more, still more preferably $1.0 \times 10^{-2}$ g or more, particularly preferably $1.0 \times 10^{-1}$ g or more. In addition, the addition rate of the sodium hypochlorite is preferably $1.0 \times 10^{2}$ g or less relative to 1 g of the ultrafine fibrous cellulose. It is preferable that after sodium hypochlorite is added to the ultrafine fibrous cellulose dispersion liquid (slurry), stirring is performed under conditions of 10° C. or more and 50° C. or less for 1 min or more and 10 h or less.

In the sub-critical water treatment step, the ultrafine fibrous cellulose dispersion liquid (slurry) is subjected to a high temperature/high pressure treatment, and is put in a sub-critical state. The ultrafine fibrous cellulose is hydrolyzed in the sub-critical state. Specifically, after the ultrafine fibrous cellulose dispersion liquid (slurry) is put in a reaction vessel, the temperature is raised to 150° C. or more and 500° C. or less, preferably 150° C. or more and 350° C. or less, and the pressure within the reaction vessel is pressurized to 10 MPa or more and 80 MPa or less, preferably 10 MPa or more and 20 MPa or less. Here, the heating/pressurizing time is preferably 0.1 sec or more and 100 sec or less, more preferably 3 sec or more and 50 sec or less.

(Fibrous Cellulose Dispersion Liquid)

The present invention also relates to a fibrous cellulose dispersion liquid (also referred to as an ultrafine fibrous cellulose-containing slurry or a slurry) obtained by dispersing the above-described ultrafine fibrous cellulose in water. The fibrous cellulose dispersion liquid may be, for example, a dispersion liquid for paint, which is used for addition to the paint.

The content of the ultrafine fibrous cellulose in the fibrous cellulose dispersion liquid is preferably 0.1% by mass or more relative to the total mass of the fibrous cellulose dispersion liquid, more preferably 0.3% by mass or more, still more preferably 0.5% by mass or more. In addition, the content of the ultrafine fibrous cellulose is preferably 8.0% by mass or less relative to the total mass of the fibrous cellulose dispersion liquid, more preferably 7.0% by mass or less, still more preferably 6.0% by mass or less.

When the fibrous cellulose dispersion liquid is a fibrous cellulose dispersion liquid having an ultrafine fibrous cellulose concentration of 0.4% by mass, the viscosity of the corresponding dispersion liquid at 23° C. is preferably 200 mPa·s or more, more preferably 300 mPa·s or more, still more preferably 350 mPa·s or more, particularly preferably 400 mPa·s or more. In addition, the viscosity of the dispersion liquid at 23° C. is preferably 3,000 mPa·s or less, more preferably 2,500 mPa·s or less. The viscosity of the dispersion liquid having an ultrafine fibrous cellulose concentration of 0.4% by mass may be measured by using a B-type viscometer (manufactured by BLOOKFIELD, an analog viscometer T-LVT). The measurement conditions are 23° C., and a rotation speed of 3 rpm, and the viscosity is measured 3 min after the start of measurement.

When the fibrous cellulose dispersion liquid is a fibrous cellulose dispersion liquid having an ultrafine fibrous cellulose concentration of 0.2% by mass, the haze of the corresponding dispersion liquid is preferably 20% or less, more preferably 15% or less, still more preferably 10% or less. The haze of the dispersion liquid in the range means that the fibrous cellulose dispersion liquid has a high transparency, and the ultrafine fibrous cellulose is satisfactorily micronized. When such a fibrous cellulose dispersion liquid is added to paint, the paint can exhibit an excellent coating suitability. Here, the haze of the fibrous cellulose dispersion liquid (ultrafine fibrous cellulose concentration: 0.2% by mass) is a value that is measured using a hazemeter (manufactured by MURAKAMI COLOR RESEARCH LABORATORY, HM-150) in accordance with JIS K 7136 after the fibrous cellulose dispersion liquid is put in a glass cell for a liquid with an optical path length of 1 cm (manufactured by FUJIWARA SCIENTIFIC, MG-40, an inverse optical path). Zero point measurement is performed with ion-exchanged water put in the same glass cell.

The fibrous cellulose dispersion liquid may contain other additives in addition to water and the ultrafine fibrous cellulose. Examples of other additives include an antifoaming agent, a lubricant, a UV absorber, a dye, a pigment, a stabilizer, a surfactant, and a preservative (for example, phenoxyethanol). In addition, the fibrous cellulose dispersion liquid may contain a hydrophilic polymer, an organic ion or the like as an optional component.

It is desirable that the hydrophilic polymer is a hydrophilic oxygen-containing organic compound (in which the cellulose fibers are excluded), and examples of the oxygen-containing organic compound include hydrophilic polymers such as polyethyleneglycol, polyethyleneoxide, casein, dextrin, starch, modified starch, polyvinylalcohol, modified polyvinylalcohol (acetoacetylated polyvinylalcohol, etc.), polyethyleneoxide, polyvinylpyrrolidone, polyvinylmethylether, polyacrylic acid salts, acrylic acid alkyl ester copolymers, urethane-based copolymers, and cellulose derivatives (hydroxyethylcellulose, carboxyethylcellulose, carboxymethylcellulose, etc.); and hydrophilic small molecules such as glycerin, sorbitol, and ethyleneglycol.

Examples of the organic ion include a tetraalkylammonium ion or a tetraalkylphosphonium ion. Examples of the tetraalkylammonium ion include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ion include a tetramethylphosphonium ion, a tetraethylphosphonium ion, a tetrapropylphosphonium ion, a tetrabutylphosphonium ion, and a lauryltrimethylphosphonium ion. In addition, as the tetrapropylonium ion and the tetrabutylonium ion, a tetra n-propylonium ion and a tetra n-butylonium ion may be exemplified, respectively.

(Use)

It is preferable that the ultrafine fibrous cellulose of the present invention is used as a thickener for various purposes. For example, the ultrafine fibrous cellulose of the present invention may be used as an additive for foods, cosmetics, cement, paint (for painting vehicles such as automobiles, ships, and aircrafts, for building materials, for daily necessaries), inks, pharmaceuticals, etc. In addition, the ultrafine fibrous cellulose of the present invention may also be applicable to daily necessaries by being added to a resin-based material or a rubber-based material. Among them, the ultrafine fibrous cellulose of the present invention is particularly preferably ultrafine fibrous cellulose for paint.

EXAMPLES

Hereinafter, the features of the present invention will be more specifically described with reference to Examples and Comparative Examples. Materials, use amounts, ratios, processing contents, processing procedures and the like described in Examples below may be properly changed as long as they do not deviate from the gist of the present invention. Therefore, the scope of the present invention should not be construed as limited by specific examples described below.

Production Example 1

[Production of phosphorylated ultrafine fibrous cellulose dispersion liquid]

As raw material pulp, needle leaved tree kraft pulp manufactured by Oji Paper (solid content: 93% by mass, basis weight: 208 g/m$^2$, sheet form, Canadian standard freeness (CSF) measured in accordance with JIS P 8121 after disaggregation is 700 ml) was used.

On the raw material pulp, a phosphorylation treatment was performed as follows. First, a mixed aqueous solution of ammonium dihydrogen phosphate and urea was added to 100 parts by mass (absolute dry mass) of the raw material pulp, and adjustment was performed for 45 parts by mass of ammonium dihydrogen phosphate, 120 parts by mass of urea, and 150 parts by mass of water. Then, chemical-impregnated pulp was obtained. Next, the obtained chemical-impregnated pulp was heated by a hot air dryer of 140° C. for 200 sec, and a phosphoric acid group was introduced into cellulose in the pulp to obtain phosphorylated pulp.

Next, a washing treatment was performed on the obtained phosphorylated pulp. The washing treatment was performed by repeating an operation in which a pulp dispersion liquid that was obtained by pouring 10 L of ion exchanged water into 100 g (absolute dry mass) of the phosphorylated pulp was stirred such that the pulp was uniformly dispersed, and then, filtering and dehydration were performed. The point in time when the electrical conductivity of the filtrate became 100 µS/cm or less was set as the end point of washing.

Next, a neutralization treatment was performed on the washed phosphorylated pulp in the following manner. First, the washed phosphorylated pulp was diluted with 10 L of ion exchanged water, and then was stirred while a 1 N sodium hydroxide aqueous solution was added thereto little by little so as to obtain a phosphorylated pulp slurry with pH of 12 to 13. Next, the corresponding phosphorylated pulp slurry was dehydrated to obtain neutralized phosphorylated pulp. Then, the washing treatment was performed on the neutralized phosphorylated pulp.

On the phosphorylated pulp obtained in this manner, an infrared absorption spectrum was measured by using FT-IR. As a result, absorption based on a phosphoric acid group was observed around 1230 cm$^{-1}$, and then it was confirmed that the phosphoric acid group was added to the pulp.

In addition, the obtained phosphorylated pulp was provided, and analyzed by an X-ray diffraction device, and as a result, typical peaks were confirmed at two positions around $2\theta=14°$ to 17° and around $2\theta=22°$ to 23°, and it was confirmed that cellulose I-type crystals were included.

Ion exchanged water was added to the obtained phosphorylated pulp to prepare a slurry with a solid content concentration of 2% by mass. This slurry was treated with a wet pulverizing device (manufactured by Sugino Machine, STAR BURST) at a pressure of 200 MPa six times, to obtain an ultrafine fibrous cellulose dispersion liquid containing ultrafine fibrous cellulose.

Through X-ray diffraction, it was confirmed that the ultrafine fibrous cellulose maintained the cellulose I-type crystals. In addition, when the fiber width of the ultrafine fibrous cellulose was measured by using a transmission type electron microscope, the result was 3 to 5 nm. An amount of phosphoric acid groups (an amount of strong acid groups) measured by a measurement method to be described below was 0.80 mmol/g.

Production Example 2

An ultrafine fibrous cellulose dispersion liquid was obtained in the same manner as in Production Example 1 except that the drying temperature of the chemical-impregnated pulp was set to 165° C. at the time of phosphorylation. An amount of phosphoric acid groups (an amount of strong acid groups) measured by the measurement method to be described below was 1.45 mmol/g.

Production Example 3

An ultrafine fibrous cellulose dispersion liquid was obtained in the same manner as in Production Example 2 except that the washed phosphorylated pulp before the neutralization treatment was further subjected to the phosphorylation treatment and the washing treatment in this order once. An amount of phosphoric acid groups (an amount of strong acid groups) measured by the measurement method to be described below was 2.00 mmol/g.

Production Example 4

[Production of TEMPO Oxidized Ultrafine Fibrous Cellulose Dispersion Liquid]

As raw material pulp, needle leaved tree kraft pulp (undried) manufactured by Oji Paper was used. On the raw material pulp, an alkali TEMPO oxidation treatment was performed as follows. First, the raw material pulp equivalent to 100 parts by mass (dry mass), 1.6 parts by mass of TEMPO (2,2,6,6-tetramethylpiperidine-1-oxyl), and 10 parts by mass of sodium bromide were dispersed in 10,000 parts by mass of water. Then, a sodium hypochlorite aqueous solution of 13% by mass was added to 1.0 g of the pulp up to 1.3 mmol and the reaction was started. During the reaction, a 0.5 M sodium hydroxide aqueous solution was added dropwise so that pH was maintained at 10 to 10.5, and then a point in time when no change occurred in pH was considered as the end of the reaction.

Next, a washing treatment was performed on the obtained TEMPO oxidized pulp. The washing treatment was performed by repeating an operation in which a dehydrated sheet was obtained by dehydrating the TEMPO oxidized pulp slurry, and was uniformly dispersed through stirring after 5000 parts by mass of ion exchanged water was poured, and then filtration and dehydration were performed. The point in time when the electrical conductivity of the filtrate became 100 µS/cm or less was set as the end point of washing.

On the dehydrated sheet, an additional oxidation treatment of a remaining aldehyde group was performed as follows. The dehydrated sheet equivalent to 100 parts by mass (dry mass) was dispersed in 10,000 parts by mass of 0.1 mol/L acetic acid buffer (pH 4.8). Then, 113 parts by mass of 80% sodium chlorite was added, and after immediate sealing, a reaction was performed at room temperature for 48 h while stirring was performed by using a magnetic stirrer at 500 rpm. Then, a pulp slurry was obtained.

Next, a washing treatment was performed on the obtained TEMPO oxidized pulp which had been subjected to the additional oxidation. The washing treatment was performed by repeating an operation in which a dehydrated sheet was obtained by dehydrating the additionally oxidized pulp slurry, and was uniformly dispersed through stirring after 5000 parts by mass of ion exchanged water was poured, and then filtration and dehydration were performed. The point in time when the electrical conductivity of the filtrate became 100 µS/cm or less was set as the end point of washing.

In addition, the obtained TEMPO oxidized pulp was provided, and analyzed by an X-ray diffraction device, and as a result, typical peaks were confirmed at two positions around 2θ=14° to 17° and around 2θ=22° to 23°, and it was confirmed that cellulose I-type crystals were included.

Ion exchanged water was added to the obtained TEMPO oxidized pulp to prepare a slurry with a solid content concentration of 2% by mass. This slurry was treated with a wet pulverizing device (manufactured by Sugino Machine, STAR BURST) at a pressure of 200 MPa six times, to obtain an ultrafine fibrous cellulose dispersion liquid containing ultrafine fibrous cellulose.

Through X-ray diffraction, it was confirmed that the ultrafine fibrous cellulose maintained cellulose I-type crystals. In addition, when the fiber width of the ultrafine fibrous cellulose was measured by using a transmission type electron microscope, the result was 3 to 5 nm. An amount of carboxy groups measured by a measurement method to be described below was 0.70 mmol/g.

Production Example 5

An ultrafine fibrous cellulose dispersion liquid was obtained in the same manner as in Production Example 4 except that the amount of the sodium hypochlorite solution during the oxidation reaction was set to 3.8 mmol relative to 1.0 g of the pulp. An amount of carboxy groups measured by the measurement method to be described below was 1.30 mmol/g.

Production Example 6

An ultrafine fibrous cellulose dispersion liquid was obtained in the same manner as in Production Example 4 except that the amount of the sodium hypochlorite solution during the oxidation reaction was set to 10 mmol relative to 1.0 g of the pulp. An amount of carboxy groups measured by the measurement method to be described below was 1.80 mmol/g.

Example 1

(Thixotropy Reduction by Ozone Treatment)

1,000 g of the ultrafine fibrous cellulose dispersion liquid (solid content concentration 2% by mass, solid content 20 g) obtained in Production Example 1 was stirred within a sealed container at 25° C. for 2 min after 1 L of an ozone/oxygen mixed gas with an ozone concentration of 200 g/m$^3$ was added thereto, and then was allowed to stand still for 30 min. Here, the ozone addition rate was $1.0 \times 10^{-2}$ g relative to 1 g of the ultrafine fibrous cellulose. Then, the container was opened and stirring was performed for 5 h to volatilize remaining ozone in the dispersion liquid. In this manner, a thixotropy reduction of the ultrafine fibrous cellulose was performed, and on the obtained low thixotropy ultrafine fibrous cellulose dispersion liquid, the viscosity, the degree of polymerization and the viscosity change rate were measured by a method to be described below.

Example 2

A low thixotropy ultrafine fibrous cellulose dispersion liquid was obtained in the same manner as in Example 1 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 3

A low thixotropy ultrafine fibrous cellulose dispersion liquid was obtained in the same manner as in Example 1 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 4

A low thixotropy ultrafine fibrous cellulose dispersion liquid was obtained in the same manner as in Example 1 except that an ozone/oxygen mixed gas with an ozone concentration of 40 g/m$^3$ was used. Here, the ozone addition rate was $2.0 \times 10^{-3}$ g relative to 1 g of the ultrafine fibrous cellulose. On the obtained low thixotropy ultrafine fibrous cellulose dispersion liquid, the viscosity, the degree of polymerization and the viscosity change rate were measured by the method to be described below.

Example 5

A low thixotropy ultrafine fibrous cellulose dispersion liquid was obtained in the same manner as in Example 4 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 6

A low thixotropy ultrafine fibrous cellulose dispersion liquid was obtained in the same manner as in Example 4 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 7

(Thixotropy Reduction by Enzyme Treatment)
20 g of an enzyme-containing liquid (manufactured by AB Enzymes, ECOPULP R, enzyme content is about 5% by mass) (diluted 1,000 times) was added to 1,000 g of the ultrafine fibrous cellulose dispersion liquid (solid content concentration 2% by mass, solid content 20 g) obtained in Production Example 1, and stirring was performed at a temperature of 50° C. for 1 h. Here, the enzyme addition rate was about $5.0 \times 10^{-5}$ g relative to 1 g of the ultrafine fibrous cellulose. Then, stirring was performed at a temperature of 100° C. for 1 h to inactivate the enzyme. On the obtained low thixotropy ultrafine fibrous cellulose dispersion liquid, the viscosity, the degree of polymerization and the viscosity change rate were measured by the method to be described below.

Example 8

A low thixotropy ultrafine fibrous cellulose dispersion liquid was obtained in the same manner as in Example 7 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 9

A low thixotropy ultrafine fibrous cellulose dispersion liquid was obtained in the same manner as in Example 7 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 10

A low thixotropy ultrafine fibrous cellulose dispersion liquid was obtained in the same manner as in Example 7 except that 4 g of the enzyme-containing liquid (manufactured by AB Enzymes, ECOPULP R, enzyme content is about 5% by mass) (diluted 1,000 times) was added to 1,000 g of the ultrafine fibrous cellulose dispersion liquid (solid content concentration 2% by mass, solid content 20 g). Here, the enzyme addition rate was about $1.0 \times 10^{-5}$ g relative to 1 g of the ultrafine fibrous cellulose. On the obtained low thixotropy ultrafine fibrous cellulose dispersion liquid, the viscosity, the degree of polymerization and the viscosity change rate were measured by the method to be described below.

Example 11

A low thixotropy ultrafine fibrous cellulose dispersion liquid was obtained in the same manner as in Example 10 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 12

A low thixotropy ultrafine fibrous cellulose dispersion liquid was obtained in the same manner as in Example 10 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 13

(Thixotropy Reduction by Sodium Hypochlorite Treatment)

To 1,000 g of the ultrafine fibrous cellulose dispersion liquid (solid content concentration 2% by mass, solid content 20 g) obtained in Production Example 1, 170 g of a sodium hypochlorite solution (effective chlorine concentration 12% by mass) was added, and stirring was performed at room temperature for 1 h. Here, the addition rate of sodium hypochlorite was 1.02 g relative to 1 g of the ultrafine fibrous cellulose. On the obtained low thixotropy ultrafine fibrous cellulose dispersion liquid, the viscosity, the degree of polymerization and the viscosity change rate were measured by the method to be described below.

Example 14

A low thixotropy ultrafine fibrous cellulose dispersion liquid was obtained in the same manner as in Example 13 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 15

A low thixotropy ultrafine fibrous cellulose dispersion liquid was obtained in the same manner as in Example 13 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 16

A low thixotropy ultrafine fibrous cellulose dispersion liquid was obtained in the same manner as in Example 13 except that 1.70 g of the sodium hypochlorite solution (effective chlorine concentration 12% by mass) was added to 1,000 g of the ultrafine fibrous cellulose dispersion liquid (solid content concentration 2% by mass, solid content 20 g). Here, the addition rate of sodium hypochlorite was $1.02 \times 10^{-2}$ parts by mass relative to 1 part by mass of the ultrafine fibrous cellulose. On the obtained low thixotropy ultrafine fibrous cellulose dispersion liquid, the viscosity, the degree of polymerization and the viscosity change rate were measured by the method to be described below.

Example 17

A low thixotropy ultrafine fibrous cellulose dispersion liquid was obtained in the same manner as in Example 16 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 18

A low thixotropy ultrafine fibrous cellulose dispersion liquid was obtained in the same manner as in Example 16 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 19

(Thixotropy Reduction by Sub-Critical Water Treatment)

The ultrafine fibrous cellulose dispersion liquid obtained in Production Example 1 was put in a reactor, and was heated for 10 sec while the temperature was raised to 200° C. Here, the pressure within the reactor was 20 MPa. After the completion of heating, the reactor was water-cooled, and then the low thixotropy ultrafine fibrous cellulose dispersion liquid within the reactor was recovered. On the obtained low thixotropy ultrafine fibrous cellulose dispersion liquid, the viscosity, the degree of polymerization and the viscosity change rate were measured by the method to be described below.

Example 20

A low thixotropy ultrafine fibrous cellulose dispersion liquid was obtained in the same manner as in Example 19 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 21

A low thixotropy ultrafine fibrous cellulose dispersion liquid was obtained in the same manner as in Example 19 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 22

A low thixotropy ultrafine fibrous cellulose dispersion liquid was obtained in the same manner as in Example 19 except that the heating time was set to 1 sec. On the obtained low thixotropy ultrafine fibrous cellulose dispersion liquid, the viscosity, the degree of polymerization and the viscosity change rate were measured by the method to be described below.

Example 23

A low thixotropy ultrafine fibrous cellulose dispersion liquid was obtained in the same manner as in Example 22 except that the ultrafine fibrous cellulose dispersion liquid obtained in Production Example 2 was used. On the obtained low thixotropy ultrafine fibrous cellulose dispersion liquid, the viscosity, the degree of polymerization and the viscosity change rate were measured by the method to be described below.

Example 24

A low thixotropy ultrafine fibrous cellulose dispersion liquid was obtained in the same manner as in Example 22 except that the ultrafine fibrous cellulose dispersion liquid obtained in Production Example 3 was used. On the obtained low thixotropy ultrafine fibrous cellulose dispersion liquid, the viscosity, the degree of polymerization and the viscosity change rate were measured by the method to be described below.

Example 25

A low thixotropy ultrafine fibrous cellulose dispersion liquid was obtained in the same manner as in Example 1 except that the ultrafine fibrous cellulose dispersion liquid obtained in Production Example 4 was used. On the obtained low thixotropy ultrafine fibrous cellulose dispersion liquid, the viscosity, the degree of polymerization and the viscosity change rate were measured by the method to be described below.

Example 26

A low thixotropy ultrafine fibrous cellulose dispersion liquid was obtained in the same manner as in Example 1 except that the ultrafine fibrous cellulose dispersion liquid obtained in Production Example 5 was used. On the obtained low thixotropy ultrafine fibrous cellulose dispersion liquid, the viscosity, the degree of polymerization and the viscosity change rate were measured by the method to be described below.

Example 27

A low thixotropy ultrafine fibrous cellulose dispersion liquid was obtained in the same manner as in Example 1 except that the ultrafine fibrous cellulose dispersion liquid obtained in Production Example 6 was used. On the obtained low thixotropy ultrafine fibrous cellulose dispersion liquid, the viscosity, the degree of polymerization and the viscosity change rate were measured by the method to be described below.

Comparative Example 1

100 g of the phosphorylated pulp (solid content concentration 20% by mass, solid content 20 g) obtained in Production Example 1 was stirred within a sealed container at 25° C. for 2 min after 1 L of an ozone/oxygen mixed gas with an ozone concentration of 200 g/m$^3$ was added thereto, and then was allowed to stand still for 30 min. Here, the ozone addition rate was $1.0 \times 10^{-2}$ g relative to 1 g of the ultrafine fibrous cellulose. Then, the phosphorylated pulp was washed to remove remaining ozone. Next, a slurry with a solid content concentration of 2% by mass was prepared by using the obtained pulp. This slurry was treated with a wet pulverizing device (manufactured by Sugino Machine, STAR BURST) at a pressure of 200 MPa six times to obtain an ultrafine fibrous cellulose dispersion liquid containing ultrafine fibrous cellulose. By using the obtained ultrafine fibrous cellulose dispersion liquid as it was, the viscosity, the degree of polymerization and the viscosity change rate were measured by the method to be described below.

Comparative Example 2

An ultrafine fibrous cellulose dispersion liquid containing ultrafine fibrous cellulose was obtained in the same manner as in Comparative Example 1 except that the phosphorylated pulp obtained in Production Example 2 was used. By using the obtained ultrafine fibrous cellulose dispersion liquid as it was, the viscosity, the degree of polymerization and the viscosity change rate were measured by the method to be described below.

Comparative Example 3

An ultrafine fibrous cellulose dispersion liquid containing ultrafine fibrous cellulose was obtained in the same manner as in Comparative Example 1 except that the phosphorylated pulp obtained in Production Example 3 was used. By using the obtained ultrafine fibrous cellulose dispersion liquid as it was, the viscosity, the degree of polymerization and the viscosity change rate were measured by the method to be described below.

Comparative Example 4

By using the ultrafine fibrous cellulose dispersion liquid obtained in Production Example 1 as it was, the viscosity, the degree of polymerization and the viscosity change rate were measured by the method to be described below.

Comparative Example 5

By using the ultrafine fibrous cellulose dispersion liquid obtained in Production Example 2 as it was, the viscosity, the degree of polymerization and the viscosity change rate were measured by the method to be described below.

Comparative Example 6

By using the ultrafine fibrous cellulose dispersion liquid obtained in Production Example 3 as it was, the viscosity, the degree of polymerization and the viscosity change rate were measured by the method to be described below.

Comparative Example 7

By using the ultrafine fibrous cellulose dispersion liquid obtained in Production Example 4 as it was, the viscosity, the degree of polymerization and the viscosity change rate were measured by the method to be described below.

Comparative Example 8

By using the ultrafine fibrous cellulose dispersion liquid obtained in Production Example 5 as it was, the viscosity, the degree of polymerization and the viscosity change rate were measured by the method to be described below.

Comparative Example 9

By using the ultrafine fibrous cellulose dispersion liquid obtained in Production Example 6 as it was, the viscosity, the degree of polymerization and the viscosity change rate were measured by the method to be described below.

<Measurement>

[Measurement of Amount of Phosphoric Acid Groups]

The amount of phosphoric acid groups in ultrafine fibrous cellulose was measured by performing a treatment with an ion-exchanged resin on a fibrous cellulose-containing slurry that is prepared by diluting an ultrafine fibrous cellulose dispersion liquid containing target ultrafine fibrous cellulose with ion exchanged water (a content of 0.2% by mass), and then performing titration using alkali.

The treatment with the ion-exchanged resin was performed by adding a strong acid ion-exchanged resin (Amberjet 1024; ORGANO CORPORATION, conditioned) with a volume of 1/10 to the fibrous cellulose-containing slurry, performing shaking for 1 h, and then separating the resin from the slurry through pouring on a mesh having a mesh size of 90 μm.

In addition, the titration using alkali was performed by measuring the change in a pH value indicated by the slurry while adding 10 μL of a 0.1 N sodium hydroxide aqueous solution every 5 seconds to the fibrous cellulose-containing slurry that had been subjected to the treatment with the ion-exchanged resin. The titration was performed while blowing nitrogen gas to the slurry from 15 min before the start of titration. In this neutralization titration, on the curve plotting the measured pH relative to the addition amount of alkali, two points at which the increment (a differential value of pH relative to a dropping amount of alkali) is maximized are observed. Between these, a firstly obtained maximum point of the increment when alkali is added is called a first end point, and a secondly obtained maximum point of the increment is called a second end point (FIG. 1). The amount of required alkali from the start of titration to the first end point is equal to a first dissociated acid amount in the slurry used for the titration. In addition, the amount of required alkali from the start of titration to the second end point is equal to the total dissociated acid amount in the slurry used for the titration. A value obtained by dividing the amount (mmol) of required alkali from the start of titration to the first end point by the solid content (g) in the slurry as a titration target was set as an amount of the phosphoric acid groups (mmol/g).

[Measurement of Amount of Carboxy Groups]

The amount of carboxy groups in ultrafine fibrous cellulose was measured by adding ion exchanged water to an ultrafine fibrous cellulose-containing slurry containing target ultrafine fibrous cellulose to have a content of 0.2% by mass, performing a treatment with an ion-exchanged resin, and then performing titration using alkali.

The treatment with the ion-exchanged resin was performed by adding a strong acid ion-exchanged resin (Amberjet 1024; manufactured by ORGANO CORPORATION, conditioned) with a volume of 1/10 to the ultrafine fibrous cellulose-containing slurry of 0.2% by mass, performing shaking for 1 h, and then, separating the resin from the slurry through pouring on a mesh having a mesh size of 90 μm.

In addition, the titration using alkali was performed by measuring the change in a pH value indicated by the slurry while adding 10 μL of a 0.1 N sodium hydroxide aqueous solution every 5 seconds to the fibrous cellulose-containing slurry that had been subjected to the treatment with the ion-exchanged resin. When the change in pH is observed while a sodium hydroxide aqueous solution is added, a titration curve illustrated in FIG. 2 is obtained. As illustrated in FIG. 2, in the neutralization titration, on the curve plotting the measured pH relative to the addition amount of alkali, one point at which the increment (a differential value of pH relative to a dropping amount of alkali) is maximized is observed. This increment maximum point is called a first end point. Here, a region from the start of titration to the first end point in FIG. 2 is called a first region. The amount of alkali required for the first region is equal to the amount of the carboxy groups in the slurry used for titration. Then, an introduction amount of the carboxy groups (mmol/g) was calculated by dividing the amount of alkali (mmol) required for the first region on the titration curve by the solid content (g) in the ultrafine fibrous cellulose-containing slurry as a titration target.

The above-described introduction amount of the carboxy groups (mmol/g) indicates the amount of substituents (hereinafter, referred to as the amount of the carboxy groups (acid type)) per 1 g of the mass of the fibrous cellulose when the counterion of the carboxy group is a hydrogen ion ($H^+$).

[Viscosity Measurement of Ultrafine Fibrous Cellulose Dispersion Liquid]

The viscosity of an ultrafine fibrous cellulose dispersion liquid was measured as follows. First, the ultrafine fibrous cellulose dispersion liquid was diluted with ion exchanged water to have a solid content concentration of 0.4% by mass, and then, was stirred by a disperser at 1500 rpm for 5 min. Then, the viscosity of the dispersion liquid obtained in this manner was measured by using a B-type viscometer (manufactured by BLOOKFIELD, an analog viscometer T-LVT). Under the measurement condition of a rotation speed of 3 rpm, 3 min after the start of measurement, the viscosity value was set as the viscosity of the corresponding dispersion liquid. In addition, the dispersion liquid as a measurement target was allowed to stand still for 24 h under an environment of 23° C. and a relative humidity of 50% before the measurement. The liquid temperature of the dispersion liquid at the time of measurement was 23° C.

[Measurement on Specific Viscosity and Degree of Polymerization of Ultrafine Fibrous Cellulose]

The specific viscosity and the degree of polymerization of ultrafine fibrous cellulose were measured according to Tappi T230. After measurement was performed on a viscosity (referred to as η1) measured when cellulose fibers as a measurement target were dispersed in a dispersion medium, and a blank viscosity (referred to as η0) measured by only a dispersion medium, a specific viscosity (ηsp) and an intrinsic viscosity ([η]) were measured according to the following formulae.

$$\eta sp = (\eta 1/\eta 0) - 1$$

$$[\eta] = \eta sp/(c(1+0.28 \times \eta sp))$$

Here, c in the formula indicates a concentration of the ultrafine fibrous cellulose at the time of the viscosity measurement. In addition, the degree of polymerization (DP) of the ultrafine fibrous cellulose was calculated from the following formula.

$$DP = 1.75 \times [\eta]$$

This degree of polymerization is an average degree of polymerization measured according to a viscosity method, and thus may be referred to as a "viscosity average degree of polymerization."

[Measurement of Viscosity Change Rate of Ultrafine Fibrous Cellulose Dispersion Liquid]

The viscosity change rate of an ultrafine fibrous cellulose dispersion liquid was measured as follows.

(Measurement of Viscosity Before Stirring)

First, an ultrafine fibrous cellulose dispersion liquid was diluted with ion exchanged water such that the viscosity became about 2,500 mPa·s when measured by a method to be described below, and then the ultrafine fibrous cellulose dispersion liquid was put in a cylindrical container having a diameter of 10 cm to a height of 5 cm, and was stirred by a disperser for 5 min at 1500 rpm. 1 min after the end of stirring, the viscosity of the obtained ultrafine fibrous cellulose dispersion liquid, was measured by using a B-type viscometer (manufactured by BLOOKFIELD, an analog viscometer T-LVT). Under the measurement condition of a rotation speed of 6 rpm, 1 min after the start of measurement, the viscosity value was set as the viscosity of the corresponding dispersion liquid. In addition, the liquid temperature of the dispersion liquid at the time of measurement was 23° C.

(Stirring by Stirrer)

Next, the obtained ultrafine fibrous cellulose dispersion liquid (the ultrafine fibrous cellulose dispersion liquid having a viscosity of about 2,500 mPa·s) was put in a cylindrical container having a diameter of 10 cm to a height of 5 cm, and was stirred for 24 h by using an elliptical stirrer having a length of 5 cm, a width of 2 cm at the center, and a width of 1 cm at the end while a 2 cm-recessed state at the center of a liquid surface was maintained. The liquid temperature of the dispersion liquid during stirring was 23° C.

(Measurement of Viscosity After Stirring)

1 min after the end of stirring by a stirrer, the viscosity of the ultrafine fibrous cellulose dispersion liquid was immediately measured by using a B-type viscometer (manufactured by BLOOKFIELD, an analog viscometer T-LVT). Under a measurement condition of a rotation speed of 6 rpm, 1 min after the start of measurement, the viscosity value was set as the viscosity of the corresponding dispersion liquid. In addition, the liquid temperature of the dispersion liquid at the time of measurement was 23° C.

(Calculation of Viscosity Change Rate)

A viscosity change rate before/after stirring by a stirrer was calculated from the following formula.

$$\text{viscosity change rate (\%)} = (\text{viscosity after stirring} - \text{viscosity before stirring}) / \text{viscosity before stirring} \times 100$$

<Evaluation>

[Evaluation of Coating Suitability of Paint]

The coating suitability of paint using the ultrafine fibrous cellulose dispersion liquid obtained by the present invention was evaluated in the following manner.

(Preparation of Ultrafine Fibrous Cellulose-Containing Paint)

To 100 parts by mass of the ultrafine fibrous cellulose dispersion liquid that had a viscosity of about 2,500 mPa·s and was obtained by the same method as above, 1 part by mass of a bright material (aluminum paste WXM7640, manufactured by TOYO ALUMINIUM, aluminum concentration: 58 to 61% by mass) was added, and then stirring was performed by a disperser at 1500 rpm for 5 min to obtain ultrafine fibrous cellulose-containing paint.

(Circulation and Spray Coating of Paint)

Next, the obtained ultrafine fibrous cellulose-containing paint was circulated through the inside of a pipe by a pump-type circulation device for 24 h. Immediately after the circulation was ended, the ultrafine cellulose-containing paint was applied to a wall surface with a spray gun, and the presence/absence of sagging was confirmed. In addition, the presence/absence of sedimentation of the bright material in the ultrafine cellulose-containing paint was visually confirmed at the time of coating. From the results of sagging of the paint and sedimentation of the bright material, the coating suitability of the ultrafine fibrous cellulose-containing paint was evaluated by four levels.

A: during coating after the paint is circulated, sagging and bright material sedimentation are not observed, and thus the coating suitability is very good.

B: during coating after the paint is circulated, either sagging or bright material sedimentation is observed, but is slight, and thus the coating suitability is good.

C: during coating after the paint is circulated, sagging and bright material sedimentation are observed, and thus the coating suitability is slightly poor, but there is no problem in practical use.

D: during coating after the paint is circulated, sagging and bright material sedimentation are significantly observed, and thus the coating suitability is poor, and there is a problem in practical use.

TABLE 1

| | | Ex. 1 | Ex. 2 | Ex. 3 | Ex. 4 | Ex. 5 | Ex. 6 |
|---|---|---|---|---|---|---|---|
| Substituent | | Phosphoric acid group | Phosphoric acid group | Phosphoric acid group | Phosphoric acid group | Phosphoric acid group | Phosphoric acid group |
| Amount of substituents [mmol/g] | | 0.80 | 1.45 | 2.00 | 0.80 | 1.45 | 2.00 |
| Viscosity reduction treatment | | Ozone (concentration 200 g/m$^3$) | Ozone (concentration 200 g/m$^3$) | Ozone (concentration 200 g/m$^3$) | Ozone (concentration 40 g/m$^3$) | Ozone (concentration 40 g/m$^3$) | Ozone (concentration 40 g/m$^3$) |
| Viscosity [mPs · s] at 0.4% by mass | | 520 | 450 | 480 | 2200 | 2020 | 1980 |
| Degree of polymerization | | 426 | 359 | 353 | 480 | 427 | 397 |
| Viscosity change rate | Solid content concentration [% by mass] | 0.75 | 0.75 | 0.75 | 0.60 | 0.60 | 0.60 |
| | Viscosity before stirring [mPa · s] | 2440 | 2320 | 2640 | 2680 | 2680 | 2560 |
| | Viscosity after stirring [mPa · s] | 2400 | 2160 | 2320 | 2240 | 2000 | 1800 |
| | Viscosity change rate [%] | −1.6 | −6.9 | −12.1 | −16.4 | −25.4 | −29.7 |
| Coating suitability of paint | | A | A | B | B | C | C |

| | | Ex. 7 | Ex. 8 | Ex. 9 | Ex. 10 | Ex. 11 | Ex. 12 |
|---|---|---|---|---|---|---|---|
| Substituent | | Phosphoric acid group | Phosphoric acid group | Phosphoric acid group | Phosphoric acid group | Phosphoric acid group | Phosphoric acid group |
| Amount of substituents [mmol/g] | | 0.80 | 1.45 | 2.00 | 0.80 | 1.45 | 2.00 |
| Viscosity reduction treatment | | Enzyme (20 g added) | Enzyme (20 g added) | Enzyme (20 g added) | Enzyme (4 g added) | Enzyme (4 g added) | Enzyme (4 g added) |

TABLE 1-continued

|  |  |  |  |  |  |  |
|---|---|---|---|---|---|---|
| Viscosity [mPs · s] at 0.4% by mass | 620 | 440 | 420 | 1820 | 2220 | 2100 |
| Degree of polymerization | 433 | 365 | 340 | 477 | 431 | 402 |
| Viscosity change rate — Solid content concentration [% by mass] | 0.75 | 0.75 | 0.75 | 0.60 | 0.60 | 0.60 |
| Viscosity before stirring [mPa · s] | 2600 | 2320 | 2580 | 2400 | 2720 | 2480 |
| Viscosity after stirring [mPa · s] | 2520 | 2120 | 2280 | 1960 | 2040 | 1800 |
| Viscosity change rate [%] | −3.1 | −8.6 | −11.6 | −18.3 | −25.0 | −27.4 |
| Coating suitability of paint | A | A | B | B | C | C |

TABLE 2

|  | Ex. 13 | Ex. 14 | Ex. 15 | Ex. 16 | Ex. 17 | Ex. 18 |
|---|---|---|---|---|---|---|
| Substituent | Phosphoric acid group | Phosphoric acid group | Phosphoric acid group | Phosphoric acid group | Phosphoric acid group | Phosphoric acid group |
| Amount of substituents [mmol/g] | 0.80 | 1.45 | 2.00 | 0.80 | 1.45 | 2.00 |
| Viscosity reduction treatment | Sodium hypochlorite (170 g added) | Sodium hypochlorite (170 g added) | Sodium hypochlorite (170 g added) | Sodium hypochlorite (1.70 g added) | Sodium hypochlorite (1.70 g added) | Sodium hypochlorite (1.70 g added) |
| Viscosity [mPs · s] at 0.4% by mass | 640 | 560 | 560 | 2160 | 2320 | 2260 |
| Degree of polymerization | 442 | 380 | 378 | 482 | 435 | 399 |
| Viscosity change rate — Solid content concentration [% by mass] | 0.75 | 0.75 | 0.75 | 0.60 | 0.60 | 0.60 |
| Viscosity before stirring [mPa · s] | 2440 | 2600 | 2640 | 2780 | 2640 | 2320 |
| Viscosity after stirring [mPa · s] | 2320 | 2320 | 2280 | 2160 | 2000 | 1680 |
| Viscosity change rate [%] | −4.9 | −10.8 | −13.6 | −22.3 | −24.2 | −27.6 |
| Coating suitability of paint | A | B | B | C | C | C |

|  | Ex. 19 | Ex. 20 | Ex. 21 | Ex. 22 | Ex. 23 | Ex. 24 |
|---|---|---|---|---|---|---|
| Substituent | Phosphoric acid group | Phosphoric acid group | Phosphoric acid group | Phosphoric acid group | Phosphoric acid group | Phosphoric acid group |
| Amount of substituents [mmol/g] | 0.80 | 1.45 | 2.00 | 0.80 | 1.45 | 2.00 |
| Viscosity reduction treatment | Sub-critical water (heating time 10 sec) | Sub-critical water (heating time 10 sec) | Sub-critical water (heating time 10 sec) | Sub-critical water (heating time 1 sec) | Sub-critical water (heating time 1 sec) | Sub-critical water (heating time 1 sec) |
| Viscosity [mPs · s] at 0.4% by mass | 420 | 440 | 380 | 1780 | 1880 | 1640 |
| Degree of polymerization | 412 | 366 | 343 | 466 | 416 | 380 |
| Viscosity change rate — Solid content concentration [% by mass] | 0.75 | 0.75 | 0.75 | 0.60 | 0.60 | 0.60 |
| Viscosity before stirring [mPa · s] | 2560 | 2680 | 2280 | 2440 | 2400 | 2200 |
| Viscosity after stirring [mPa · s] | 2520 | 2440 | 1960 | 2000 | 1880 | 1680 |
| Viscosity change rate [%] | −1.6 | −9.0 | −14.0 | −18.0 | −21.7 | −23.6 |
| Coating suitability of paint | A | A | B | B | C | C |

TABLE 3

|  | Ex. 25 | Ex. 26 | Ex. 27 | Comp. Ex. 1 | Comp. Ex. 2 | Comp. Ex. 3 |
|---|---|---|---|---|---|---|
| Substituent | Carboxy group | Carboxy group | Carboxy group | Phosphoric acid group | Phosphoric acid group | Phosphoric acid group |
| Amount of substituents [mmol/g] | 0.70 | 1.30 | 1.80 | 0.80 | 1.45 | 2.00 |
| Viscosity reduction treatment | Ozone (concentration 200 g/m$^3$) | Ozone (concentration 200 g/m$^3$) | Ozone (concentration 200 g/m$^3$) | Ozone (before defibration) (concentration 200 g/m$^3$) | Ozone (before defibration) (concentration 200 g/m$^3$) | Ozone (before defibration) (concentration 200 g/m$^3$) |
| Viscosity [mPs · s] at 0.4% by mass | 620 | 560 | 520 | 6440 | 6200 | 5560 |
| Degree of polymerization | 439 | 386 | 340 | 496 | 469 | 420 |
| Viscosity change rate — Solid content concentration [% by mass] | 0.75 | 0.75 | 0.75 | 0.50 | 0.50 | 0.50 |
| Viscosity before stirring [mPa · s] | 2780 | 2460 | 2380 | 2520 | 2320 | 2240 |

TABLE 3-continued

|  | | | | | | |
|---|---|---|---|---|---|---|
| Viscosity after stirring [mPa · s] | 2360 | 2000 | 1960 | 1200 | 960 | 880 |
| Viscosity change rate [%] | −15.1 | −18.7 | −17.6 | −52.4 | −58.6 | −60.7 |
| Coating suitability of paint | A | A | A | D | D | D |

| | | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|
| Substituent | | Phosphoric acid group | Phosphoric acid group | Phosphoric acid group | Carboxy group | Carboxy group | Carboxy group |
| Amount of substituents [mmol/g] | | 0.80 | 1.45 | 2.00 | 0.70 | 1.30 | 1.80 |
| Viscosity reduction treatment | | None | None | None | None | None | None |
| Viscosity [mPs · s] at 0.4% by mass | | 12000 | 10000 | 8000 | 12000 | 11000 | 8000 |
| Degree of polymerization | | 526 | 506 | 445 | 532 | 502 | 462 |
| Viscosity change rate | Solid content concentration [% by mass] | 0.40 | 0.45 | 0.45 | 0.40 | 0.40 | 0.45 |
| | Viscosity before stirring [mPa · s] | 2320 | 2680 | 2400 | 2540 | 2280 | 2640 |
| | Viscosity after stirring [mPa · s] | 720 | 640 | 600 | 640 | 400 | 520 |
| | Viscosity change rate [%] | −69.0 | −76.1 | −75.0 | −74.8 | −82.5 | −80.3 |
| Coating suitability of paint | | D | D | D | D | D | D |

Production Example 101

[Production of sub-phosphorylated ultrafine fibrous cellulose dispersion liquid]

As raw material pulp, needle leaved tree kraft pulp manufactured by Oji Paper (solid content 93% by mass, basis weight 245 g/m², sheet form, Canadian standard freeness (CSF) measured in accordance with JIS P 8121 after disaggregation is 700 ml) was used.

On the raw material pulp, a phosphorus oxo-oxidation treatment was performed as follows. First, a mixed aqueous solution of phosphorous acid (phosphonic acid) and urea was added to 100 parts by mass (absolute dry mass) of the raw material pulp, and chemical-impregnated pulp was obtained through preparation with 33 parts by mass of phosphorous acid (phosphonic acid), 120 parts by mass of urea, and 150 parts by mass of water. Then, the obtained chemical-impregnated pulp was heated by a hot air dryer of 165° C. for 150 sec, and a phosphorous acid group was introduced into cellulose in the pulp to obtain sub-phosphorylated pulp.

Next, a washing treatment was performed on the obtained sub-phosphorylated pulp. The washing treatment was performed by repeating an operation in which a pulp dispersion liquid that was obtained by pouring 10 L of ion exchanged water into 100 g (absolute dry mass) of the sub-phosphorylated pulp was stirred such that the pulp was uniformly dispersed, and then, filtering and dehydration were performed. The point in time when the electrical conductivity of the filtrate became 100 μS/cm or less was set as the end point of washing.

Next, a neutralization treatment was performed on the washed sub-phosphorylated pulp in the following manner. First, the washed sub-phosphorylated pulp was diluted with 10 L of ion exchanged water, and then was stirred while a 1 N sodium hydroxide aqueous solution was added thereto little by little so as to obtain a sub-phosphorylated pulp slurry with pH of 12 to 13. Next, the corresponding sub-phosphorylated pulp slurry was dehydrated to obtain neutralized sub-phosphorylated pulp. Then, the washing treatment was performed on the neutralized sub-phosphorylated pulp.

On the sub-phosphorylated pulp obtained in this manner, an infrared absorption spectrum was measured by using FT-IR. As a result, absorption based on P=O of a phosphonate group as a tautomer of the phosphorous acid group was observed around 1210 cm$^{-1}$, and then it was confirmed that the phosphorous acid group (phosphonate group) was added to the pulp. In addition, the obtained sub-phosphorylated pulp was provided, and analyzed by an X-ray diffraction device, and as a result, typical peaks were confirmed at two positions around 2θ=14° to 17° around 2θ=22° to 23°, and it was confirmed that cellulose I-type crystals were included. In the obtained sub-phosphorylated pulp, an amount of phosphorous acid groups (first dissociated acid amount) measured by a measurement method described in the above-described [measurement of amount of phosphorus oxoacid groups] was 0.74 mmol/g. The total dissociated acid amount was 0.78 mmol/g.

Ion exchanged water was added to the obtained sub-phosphorylated pulp to prepare a slurry with a solid content concentration of 2% by mass. This slurry was treated with a wet pulverizing device (manufactured by Sugino Machine, STAR BURST) at a pressure of 200 MPa six times, to obtain an ultrafine fibrous cellulose dispersion liquid containing ultrafine fibrous cellulose.

Through X-ray diffraction, it was confirmed that the ultrafine fibrous cellulose maintained cellulose I-type crystals. In addition, when the fiber width of the ultrafine fibrous cellulose was measured by using a transmission type electron microscope, the result was 3 to 5 nm. An amount of phosphorous acid groups (first dissociated acid amount) measured by the above-described measurement method was 0.74 mmol/g.

Production Example 102

An ultrafine fibrous cellulose dispersion liquid was obtained in the same manner as in Production Example 101 except that the heating time of the chemical-impregnated pulp was set to 250 sec at the time of sub-phosphorylation. An amount of phosphorous acid groups (first dissociated acid amount) measured by the above-described measurement method was 1.51 mmol/g.

Production Example 103

An ultrafine fibrous cellulose dispersion liquid was obtained in the same manner as in Production Example 101 except that the heating time of the chemical-impregnated pulp was set to 400 sec at the time of sub-phosphorylation. An amount of phosphorous acid groups (first dissociated acid amount) measured by the above-described measurement method was 1.86 mmol/g.

Production Example 104

[Production of TEMPO Oxidized Ultrafine Fibrous Cellulose Dispersion liquid]

As raw material pulp, needle leaved tree kraft pulp (undried) manufactured by Oji Paper was used. On the raw material pulp, an alkali TEMPO oxidation treatment was performed as follows. First, the raw material pulp equivalent to 100 parts by mass (dry mass), 1.6 parts by mass of TEMPO (2,2,6,6-tetramethylpiperidine-1-oxyl), and 10 parts by mass of sodium bromide were dispersed in 10,000 parts by mass of water. Then, a sodium hypochlorite aqueous solution of 13% by mass was added to 1.0 g of the pulp up to 1.3 mmol and the reaction was started. During the reaction, a 0.5 M sodium hydroxide aqueous solution was added dropwise so that pH was maintained at 10 to 10.5, and then a point in time when no change occurred in pH was considered as the end of the reaction.

Next, a washing treatment was performed on the obtained TEMPO oxidized pulp. The washing treatment was performed by repeating an operation in which a dehydrated sheet was obtained by dehydrating the TEMPO oxidized pulp slurry, and was uniformly dispersed through stirring after 5000 parts by mass of ion exchanged water was poured, and then filtration and dehydration were performed. The point in time when the electrical conductivity of the filtrate became 100 µS/cm or less was set as the end point of washing.

On the dehydrated sheet, an additional oxidation treatment of a remaining aldehyde group was performed as follows. The dehydrated sheet equivalent to 100 parts by mass (dry mass) was dispersed in 10,000 parts by mass of 0.1 mol/L acetic acid buffer (pH 4.8). Then, 113 parts by mass of 80% sodium chlorite was added, and after immediate sealing, a reaction was performed at room temperature for 48 h while stirring was performed by using a magnetic stirrer at 500 rpm. Then, a pulp slurry was obtained.

Next, a washing treatment was performed on the obtained TEMPO oxidized pulp which had been subjected to the additional oxidation. The washing treatment was performed by repeating an operation in which a dehydrated sheet was obtained by dehydrating the additionally oxidized pulp slurry, and was uniformly dispersed through stirring after 5000 parts by mass of ion exchanged water was poured, and then filtration and dehydration were performed. The point in time when the electrical conductivity of the filtrate became 100 µS/cm or less was set as the end point of washing.

In addition, the obtained TEMPO oxidized pulp was provided, and analyzed by an X-ray diffraction device, and as a result, typical peaks were confirmed at two positions around 2θ=14° to 17° and around 2θ=22° to 23°, and it was confirmed that cellulose I-type crystals were included.

Ion exchanged water was added to the obtained TEMPO oxidized pulp to prepare a slurry with a solid content concentration of 2% by mass. This slurry was treated with a wet pulverizing device (manufactured by Sugino Machine, STAR BURST) at a pressure of 200 MPa six times, to obtain an ultrafine fibrous cellulose dispersion liquid containing ultrafine fibrous cellulose.

Through X-ray diffraction, it was confirmed that the ultrafine fibrous cellulose maintained cellulose I-type crystals. In addition, when the fiber width of the ultrafine fibrous cellulose was measured by using a transmission type electron microscope, the result was 3 to 5 nm. An amount of carboxy groups measured by the above-described measurement method was 0.70 mmol/g.

Production Example 105

An ultrafine fibrous cellulose dispersion liquid was obtained in the same manner as in Production Example 104 except that the amount of the sodium hypochlorite solution during the oxidation reaction was set to 3.8 mmol relative to 1.0 g of the pulp. An amount of carboxy groups measured by the above-described measurement method was 1.30 mmol/g.

Production Example 106

An ultrafine fibrous cellulose dispersion liquid was obtained in the same manner as in Production Example 104 except that the amount of the sodium hypochlorite solution during the oxidation reaction was set to 10 mmol relative to 1.0 g of the pulp. An amount of carboxy groups measured by the above-described measurement method was 1.80 mmol/g.

Example 101

(Thixotropy Reduction by Ozone Treatment)

1,000 g of the ultrafine fibrous cellulose dispersion liquid (solid content concentration 2% by mass, solid content 20 g) obtained in Production Example 101 was stirred within a sealed container at 25° C. for 2 min after 1 L of an ozone/oxygen mixed gas with an ozone concentration of 200 $g/m^3$ was added thereto, and then was allowed to stand still for 30 min. Here, the ozone addition rate was $1.0 \times 10^{-2}$ g relative to 1 g of the ultrafine fibrous cellulose. Then, the container was opened and stirring was performed for 5 h to volatilize remaining ozone in the dispersion liquid. In this manner, a thixotropy reduction of the ultrafine fibrous cellulose was performed, and on the obtained low thixotropy ultrafine fibrous cellulose dispersion liquid, the viscosity, the degree of polymerization, and the viscosity change rate were measured by the above-described method.

Example 102

A low thixotropy ultrafine fibrous cellulose dispersion liquid was obtained in the same manner as in Example 101 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 103

A low thixotropy ultrafine fibrous cellulose dispersion liquid was obtained in the same manner as in Example 101 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 104

A low thixotropy ultrafine fibrous cellulose dispersion liquid was obtained in the same manner as in Example 101 except that an ozone/oxygen mixed gas with an ozone concentration of 40 g/m$^3$ was used. Here, the ozone addition rate was $2.0 \times 10^{-3}$ g relative to 1 g of the ultrafine fibrous cellulose. On the obtained low thixotropy ultrafine fibrous cellulose dispersion liquid, the viscosity, the degree of polymerization, and the viscosity change rate were measured by the above-described method.

Example 105

A low thixotropy ultrafine fibrous cellulose dispersion liquid was obtained in the same manner as in Example 104 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 106

A low thixotropy ultrafine fibrous cellulose dispersion liquid was obtained in the same manner as in Example 104 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 107

(Thixotropy Reduction by Enzyme Treatment)
20 g of an enzyme-containing liquid (manufactured by AB Enzymes, ECOPULP R, enzyme content is about 5% by mass) (diluted 1,000 times) was added to 1,000 g of the ultrafine fibrous cellulose dispersion liquid (solid content concentration 2% by mass, solid content 20 g) obtained in Production Example 101, and stirring was performed at a temperature of 50° C. for 1 h. Here, the enzyme addition rate was about $5.0 \times 10^{-5}$ g relative to 1 g of the ultrafine fibrous cellulose. Then, stirring was performed at a temperature of 100° C. for 1 h to inactivate the enzyme. On the obtained low thixotropy ultrafine fibrous cellulose dispersion liquid, the viscosity, the degree of polymerization, and the viscosity change rate were measured by the above-described method.

Example 108

A low thixotropy ultrafine fibrous cellulose dispersion liquid was obtained in the same manner as in Example 107 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 109

A low thixotropy ultrafine fibrous cellulose dispersion liquid was obtained in the same manner as in Example 107 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 110

A low thixotropy ultrafine fibrous cellulose dispersion liquid was obtained in the same manner as in Example 107 except that 4 g of the enzyme-containing liquid (manufactured by AB Enzymes, ECOPULP R, enzyme content is about 5% by mass) (diluted 1,000 times) was added to 1,000 g of the ultrafine fibrous cellulose dispersion liquid (solid content concentration 2% by mass, solid content 20 g). Here, the enzyme addition rate was about $1.0 \times 10^{-5}$ g relative to 1 g of the ultrafine fibrous cellulose. On the obtained low thixotropy ultrafine fibrous cellulose dispersion liquid, the viscosity, the degree of polymerization, and the viscosity change rate were measured by the above-described method.

Example 111

A low thixotropy ultrafine fibrous cellulose dispersion liquid was obtained in the same manner as in Example 110 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 112

A low thixotropy ultrafine fibrous cellulose dispersion liquid was obtained in the same manner as in Example 110 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 113

(Thixotropy Reduction by Sodium Hypochlorite Treatment)
To 1,000 g of the ultrafine fibrous cellulose dispersion liquid (solid content concentration 2% by mass, solid content 20 g) obtained in Production Example 101, 170 g of a sodium hypochlorite solution (effective chlorine concentration 12% by mass) was added, and stirring was performed at room temperature for 1 h. Here, the addition rate of sodium hypochlorite was 1.02 g relative to 1 g of the ultrafine fibrous cellulose. On the obtained low thixotropy ultrafine fibrous cellulose dispersion liquid, the viscosity, the degree of polymerization, and the viscosity change rate were measured by the above-described method.

Example 114

A low thixotropy ultrafine fibrous cellulose dispersion liquid was obtained in the same manner as in Example 113 except that the ultrafine fibrous cellulose dispersion liquid obtained in Production Example 102 was used. On the obtained low thixotropy ultrafine fibrous cellulose disper-

Example 115

A low thixotropy ultrafine fibrous cellulose dispersion liquid was obtained in the same manner as in Example 113 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 116

A low thixotropy ultrafine fibrous cellulose dispersion liquid was obtained in the same manner as in Example 113 except that 1.70 g of the sodium hypochlorite solution (effective chlorine concentration 12% by mass) was added to 1,000 g of the ultrafine fibrous cellulose dispersion liquid (solid content concentration 2% by mass, solid content 20 g). Here, the addition rate of sodium hypochlorite was $1.02 \times 10^{-2}$ parts by mass relative to 1 part by mass of the ultrafine fibrous cellulose. On the obtained low thixotropy ultrafine fibrous cellulose dispersion liquid, the viscosity, the degree of polymerization, and the viscosity change rate were measured by the above-described method.

Example 117

A low thixotropy ultrafine fibrous cellulose dispersion liquid was obtained in the same manner as in Example 116 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 118

A low thixotropy ultrafine fibrous cellulose dispersion liquid was obtained in the same manner as in Example 116 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 119

(Thixotropy Reduction by Sub-Critical Water Treatment)

The ultrafine fibrous cellulose dispersion liquid obtained in Production Example 101 was put in a reactor, and was heated for 10 sec while the temperature was raised to 200° C. Here, the pressure within the reactor was 20 MPa. After the completion of heating, the reactor was water-cooled, and then the low thixotropy ultrafine fibrous cellulose dispersion liquid within the reactor was recovered. On the obtained low thixotropy ultrafine fibrous cellulose dispersion liquid, the viscosity, the degree of polymerization, and the viscosity change rate were measured by the above-described method.

Example 120

A low thixotropy ultrafine fibrous cellulose dispersion liquid was obtained in the same manner as in Example 119 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 121

A low thixotropy ultrafine fibrous cellulose dispersion liquid was obtained in the same manner as in Example 119 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

Example 122

A low thixotropy ultrafine fibrous cellulose dispersion liquid was obtained in the same manner as in Example 119 except that the heating time was set to 1 sec. On the obtained low thixotropy ultrafine fibrous cellulose dispersion liquid, the viscosity, the degree of polymerization, and the viscosity change rate were measured by the above-described method.

Example 123

A low thixotropy ultrafine fibrous cellulose dispersion liquid was obtained in the same manner as in Example 122 except that the ultrafine fibrous cellulose dispersion liquid obtained in Production Example 102 was used. On the obtained low thixotropy ultrafine fibrous cellulose dispersion liquid, the viscosity, the degree of polymerization, and the viscosity change rate were measured by the above-described method.

Example 124

A low thixotropy ultrafine fibrous cellulose dispersion liquid was obtained in the same manner as in Example 122 except that the ultrafine fibrous cellulose dispersion liquid obtained in Production Example 103 was used. On the obtained low thixotropy ultrafine fibrous cellulose dispersion liquid, the viscosity, the degree of polymerization, and the viscosity change rate were measured by the above-described method.

An FT-IR analysis was performed on a sheet obtained by dehydrating and drying the ultrafine fibrous cellulose obtained through the viscosity reduction treatment in Examples 101 to 124, and Comparative Examples 101 to 103, and as a result, absorption based on P=O of a phosphonate group as a tautomer of the phosphorous acid group was observed around 1210 $cm^{-1}$.

Comparative Example 101

100 g of the sub-phosphorylated pulp (solid content concentration 20% by mass, solid content 20 g) obtained in Production Example 101 was stirred within a sealed container at 25° C. for 2 min after 1 L of an ozone/oxygen mixed gas with an ozone concentration of 200 $g/m^3$ was added thereto, and then was allowed to stand still for 30 min. Here, the ozone addition rate was $1.0 \times 10^{-2}$ g relative to 1 g of the ultrafine fibrous cellulose. Then, the sub-phosphorylated pulp was washed to remove remaining ozone. Next, a slurry with a solid content concentration of 2% by mass was prepared by using the obtained pulp. This slurry was treated with a wet pulverizing device (manufactured by Sugino Machine, STAR BURST) at a pressure of 200 MPa six times to obtain an ultrafine fibrous cellulose dispersion liquid containing ultrafine fibrous cellulose. By using the obtained ultrafine fibrous cellulose dispersion liquid as it was, the viscosity, the degree of polymerization, and the viscosity change rate were measured by the above-described method.

Comparative Example 102

An ultrafine fibrous cellulose dispersion liquid containing ultrafine fibrous cellulose was obtained in the same manner as in Comparative Example 101 except that the sub-phosphorylated pulp obtained in Production Example 102 was used. By using the obtained ultrafine fibrous cellulose dispersion liquid as it was, the viscosity, the degree of polymerization, and the viscosity change rate were measured by the above-described method.

Comparative Example 103

An ultrafine fibrous cellulose dispersion liquid containing ultrafine fibrous cellulose was obtained in the same manner as in Comparative Example 101 except that the sub-phosphorylated pulp obtained in Production Example 103 was used. By using the obtained ultrafine fibrous cellulose dispersion liquid as it was, the viscosity, the degree of polymerization, and the viscosity change rate were measured by the above-described method.

Comparative Example 104

By using the ultrafine fibrous cellulose dispersion liquid obtained in Production Example 101 as it was, the viscosity, the degree of polymerization, and the viscosity change rate were measured by the above-described method.

Comparative Example 105

By using the ultrafine fibrous cellulose dispersion liquid obtained in Production Example 102 as it was, the viscosity, the degree of polymerization, and the viscosity change rate were measured by the above-described method.

Comparative Example 106

By using the ultrafine fibrous cellulose dispersion liquid obtained in Production Example 103 as it was, the viscosity, the degree of polymerization, and the viscosity change rate were measured by the above-described method.

Comparative Example 107

By using the ultrafine fibrous cellulose dispersion liquid obtained in Production Example 104 as it was, the viscosity, the degree of polymerization, and the viscosity change rate were measured by the above-described method.

Comparative Example 108

By using the ultrafine fibrous cellulose dispersion liquid obtained in Production Example 105 as it was, the viscosity, the degree of polymerization, and the viscosity change rate were measured by the above-described method.

Comparative Example 109

By using the ultrafine fibrous cellulose dispersion liquid obtained in Production Example 106 as it was, the viscosity, the degree of polymerization, and the viscosity change rate were measured by the above-described method.

TABLE 4

| | | Ex. 101 | Ex. 102 | Ex. 103 | Ex. 104 | Ex. 105 | Ex. 106 |
|---|---|---|---|---|---|---|---|
| Substituent | | Phosphorous acid group | Phosphorous acid group | Phosphorous acid group | Phosphorous acid group | Phosphorous acid group | Phosphorous acid group |
| Amount of substituents [mmol/g] | | 0.74 | 1.51 | 1.86 | 0.74 | 1.51 | 1.86 |
| Viscosity reduction treatment | | Ozone (concentration 200 g/m$^3$) | Ozone (concentration 200 g/m$^3$) | Ozone (concentration 200 g/m$^3$) | Ozone (concentration 40 g/m$^3$) | Ozone (concentration 40 g/m$^3$) | Ozone (concentration 40 g/m$^3$) |
| Viscosity mPs · s] at 0.4% by mass | | 520 | 450 | 480 | 2200 | 2020 | 1980 |
| Degree of polymerization | | 426 | 359 | 353 | 480 | 427 | 397 |
| Viscosity change rate | Solid content concentration [% by mass] | 0.75 | 0.75 | 0.75 | 0.60 | 0.60 | 0.60 |
| | Viscosity before stirring [mPa · s] | 2440 | 2320 | 2640 | 2680 | 2680 | 2560 |
| | Viscosity after stirring [mPa · s] | 2400 | 2160 | 2320 | 2240 | 2000 | 1800 |
| | Viscosity change rate [%] | −1.6 | −6.9 | −12.1 | −16.4 | −25.4 | −29.7 |
| Coating suitability of paint | | A | A | B | B | C | C |

| | | Ex. 107 | Ex. 108 | Ex. 109 | Ex. 110 | Ex. 111 | Ex. 112 |
|---|---|---|---|---|---|---|---|
| Substituent | | Phosphorous acid group | Phosphorous acid group | Phosphorous acid group | Phosphorous acid group | Phosphorous acid group | Phosphorous acid group |
| Amount of substituents [mmol/g] | | 0.74 | 1.51 | 1.86 | 0.74 | 1.51 | 1.86 |
| Viscosity reduction treatment | | Enzyme (20 g added) | Enzyme (20 g added) | Enzyme (20 g added) | Enzyme (4 g added) | Enzyme (4 g added) | Enzyme (4 g added) |
| Viscosity [mPs · s] at 0.4% by mass | | 620 | 440 | 420 | 1820 | 2220 | 2100 |
| Degree of polymerization | | 433 | 365 | 340 | 477 | 431 | 402 |
| | Solid content concentration [% by mass] | 0.75 | 0.75 | 0.75 | 0.60 | 0.60 | 0.60 |

TABLE 4-continued

| | | | | | | | |
|---|---|---|---|---|---|---|---|
| Viscosity change rate | Viscosity before stirring [mPa · s] | 2600 | 2320 | 2580 | 2400 | 2720 | 2480 |
| | Viscosity after stirring mPa · s] | 2520 | 2120 | 2280 | 1960 | 2040 | 1800 |
| | Viscosity change rate %] | −3.1 | −8.6 | −11.6 | −18.3 | −25.0 | −27.4 |
| Coating suitability of paint | | A | A | B | B | C | C |

TABLE 5

| | Ex. 113 | Ex. 114 | Ex. 115 | Ex. 116 | Ex. 117 | Ex. 118 |
|---|---|---|---|---|---|---|
| Substituent | Phosphorous acid group | Phosphorous acid group | Phosphorous acid group | Phosphorous acid group | Phosphorous acid group | Phosphorous acid group |
| Amount of substituents [mmol/g] | 0.74 | 1.51 | 1.86 | 0.74 | 1.51 | 1.86 |
| Viscosity reduction treatment | Sodium hypochlorite (170 g added) | Sodium hypochlorite (170 g added) | Sodium hypochlorite (170 g added) | Sodium hypochlorite (1.70 g added) | Sodium hypochlorite (1.70 g added) | Sodium hypochlorite (1.70 g added) |
| Viscosity mPs · s] at 0.4% by mass | 640 | 560 | 560 | 2160 | 2320 | 2260 |
| Degree of polymerization | 442 | 380 | 378 | 482 | 435 | 399 |
| Viscosity change rate — Solid content concentration [% by mass] | 0.75 | 0.75 | 0.75 | 0.60 | 0.60 | 0.60 |
| Viscosity before stirring [mPa · s] | 2440 | 2600 | 2640 | 2780 | 2640 | 2320 |
| Viscosity after stirring [mPa · s] | 2320 | 2320 | 2280 | 2160 | 2000 | 1680 |
| Viscosity change rate [%] | −4.9 | −10.8 | −13.6 | −22.3 | −24.2 | −27.6 |
| Coating suitability of paint | A | B | B | C | C | C |

| | Ex. 119 | Ex. 120 | Ex. 121 | Ex. 122 | Ex. 123 | Ex. 124 |
|---|---|---|---|---|---|---|
| Substituent | Phosphorous acid group | Phosphorous acid group | Phosphorous acid group | Phosphorous acid group | Phosphorous acid group | Phosphorous acid group |
| Amount of substituents [mmol/g] | 0.74 | 1.51 | 1.86 | 0.74 | 1.51 | 1.86 |
| Viscosity reduction treatment | Sub-critical water (heating time 10 sec) | Sub-critical water (heating time 10 sec) | Sub-critical water (heating time 10 sec) | Sub-critical water (heating time 1 sec) | Sub-critical water (heating time 1 sec) | Sub-critical water (heating time 1 sec) |
| Viscosity [mPs · s] at 0.4% by mass | 420 | 440 | 380 | 1780 | 1880 | 1640 |
| Degree of polymerization | 412 | 366 | 343 | 466 | 416 | 380 |
| Viscosity change rate — Solid content concentration [% by mass] | 0.75 | 0.75 | 0.75 | 0.60 | 0.60 | 0.60 |
| Viscosity before stirring [mPa · s] | 2560 | 2680 | 2280 | 2440 | 2400 | 2200 |
| Viscosity after stirring [mPa · s] | 2520 | 2440 | 1960 | 2000 | 1880 | 1680 |
| Viscosity change rate [%] | −1.6 | −9.0 | −14.0 | −18.0 | −21.7 | −23.6 |
| Coating suitability of paint | A | A | B | B | C | C |

TABLE 6

| | Comp. Ex. 101 | Comp. Ex. 102 | Comp. Ex. 103 | Comp. Ex. 104 | Comp. Ex. 105 | Comp. Ex. 106 |
|---|---|---|---|---|---|---|
| Substituent | Phosphorous acid group | Phosphorous acid group | Phosphorous acid group | Phosphorous acid group | Phosphorous acid group | Phosphorous acid group |
| Amount of substituents [mmol/g] | 0.74 | 1.51 | 1.86 | 0.74 | 1.51 | 1.86 |
| Viscosity reduction treatment | Ozone (before defibration) (concentration 200 g/m$^3$) | Ozone (before defibration) (concentration 200 g/m$^3$) | Ozone (before defibration) (concentration 200 g/m$^3$) | None | None | None |
| Viscosity [mPs · s] at 0.4% by mass | 6440 | 6200 | 5560 | 12000 | 10000 | 8000 |
| Degree of polymerization | 496 | 469 | 420 | 526 | 506 | 445 |
| Viscosity change rate — solid content concentration [% by mass] | 0.50 | 0.50 | 0.50 | 0.40 | 0.45 | 0.45 |
| viscosity before stirring [mPa · s] | 2520 | 2320 | 2240 | 2320 | 2680 | 2400 |
| viscosity after stirring [mPa · s] | 1200 | 960 | 880 | 720 | 640 | 600 |
| viscosity change rate % | −52.4 | −58.6 | −60.7 | −69.0 | −76.1 | −75.0 |

TABLE 6-continued

| Coating suitability of paint | D | D | D | D | D | D |
|---|---|---|---|---|---|---|
| | | Comp. Ex. 107 | | Comp. Ex. 108 | | Comp. Ex. 109 |
| Substituent | | Carboxy group | | Carboxy group | | Carboxy group |
| Amount of substituents [mmol/g] | | 0.70 | | 1.30 | | 1.80 |
| Viscosity reduction treatment | | None | | None | | None |
| Viscosity [mPs · s] at 0.4% by mass | | 12000 | | 11000 | | 8000 |
| Degree of polymerization | | 532 | | 502 | | 462 |
| solid content concentration [% by mass] | | 0.40 | | 0.40 | | 0.45 |
| viscosity before stirring [mPa · s] | | 2540 | | 2280 | | 2640 |
| viscosity after stirring [mPa · s] | | 640 | | 400 | | 520 |
| viscosity change rate [%] | | −74.8 | | −82.5 | | −80.3 |
| Coating suitability of paint | | D | | D | | D |

In paint using the ultrafine fibrous cellulose obtained in Examples, excellent coating suitability was exhibited.

The invention claimed is:

1. A method of producing fibrous cellulose, the method comprising:

introducing phosphoric acid groups or substituents represented by the following formula (1) or (3), or phosphorous acid groups or substituents represented by the following formula (2) into cellulose fibers:

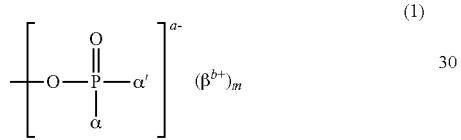

in the formula (1), a and b are natural numbers, and m is an arbitrary number, and a=b×m;

$\beta^{b+}$ is a monovalent or higher cation composed of an organic substance or an inorganic substance;

a of α and α' are O⁻, and the rest are OR,

R is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, or an aromatic group,

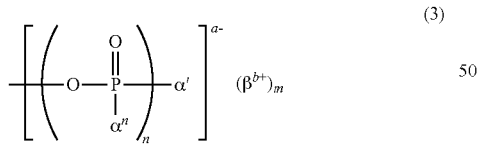

in the formula (3), a and b are natural numbers, m is an arbitrary number, n is a natural number of 2 or more, and a=b×m;

$\beta^{b+}$ is a monovalent or higher cation composed of an organic substance or an inorganic substance;

a of $\alpha^1, \alpha^2, \ldots, \alpha^n$ and α' are O⁻, and the rest are either R or OR, R is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, or an aromatic group,

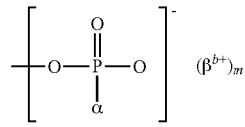

in the formula (2), b is a natural number, m is an arbitrary number, and b×m=1;

$\beta^{b+}$ is a monovalent or higher cation composed of an organic substance or an inorganic substance;

α is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, or an aromatic group, obtaining the fibrous cellulose having a fiber width of 1,000 nm or less by performing a defibration treatment on cellulose fibers; and performing a thixotropy reduction treatment on the fibrous cellulose, wherein the performing of the thixotropy reduction treatment is selected from the group consisting of setting a degree of polymerization of the fibrous cellulose to 300 or more and 500 or less, an ozone treatment step, an enzyme treatment step, a hypochlorous acid treatment step, and a sub-critical water treatment step.

2. The method of producing fibrous cellulose according to claim 1, wherein the performing of the thixotropy reduction treatment is setting a degree of polymerization of the fibrous cellulose to 300 or more and 500 or less.

3. The method of producing fibrous cellulose according to claim 1, wherein the performing of the thixotropy reduction treatment is an ozone treatment step.

* * * * *